(12) United States Patent
Tin

(10) Patent No.: US 8,564,647 B2
(45) Date of Patent: Oct. 22, 2013

(54) COLOR MANAGEMENT OF AUTOSTEREOSCOPIC 3D DISPLAYS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/764,910

(22) Filed: Apr. 21, 2010

(65) Prior Publication Data
US 2011/0261169 A1    Oct. 27, 2011

(51) Int. Cl.
*H04N 9/65* (2006.01)
*H04N 9/70* (2006.01)
*H04N 13/04* (2006.01)

(52) U.S. Cl.
USPC .......... 348/51; 348/223.1; 348/234; 348/592; 348/642; 348/649

(58) Field of Classification Search
None
See application file for complete search history.

(56) References Cited

U.S. PATENT DOCUMENTS

| | | | |
|---|---|---|---|
| 5,493,595 A * | 2/1996 | Schoolman | 378/41 |
| 6,868,177 B1 * | 3/2005 | Camahort et al. | 382/154 |
| 7,085,414 B2 | 8/2006 | Tin | |
| 7,151,849 B1 * | 12/2006 | Camahort et al. | 382/154 |
| 7,460,179 B2 * | 12/2008 | Pate et al. | 348/602 |
| 7,525,704 B2 | 4/2009 | Loce et al. | |
| 7,646,451 B2 * | 1/2010 | Vogel et al. | 349/70 |
| 7,848,577 B2 * | 12/2010 | Obrador et al. | 382/218 |
| 7,940,434 B2 * | 5/2011 | Inoue | 358/518 |
| 7,986,332 B2 * | 7/2011 | Matsuda | 345/690 |
| 8,014,027 B1 * | 9/2011 | Kulkarni et al. | 358/1.9 |
| 8,189,035 B2 * | 5/2012 | Yuan et al. | 348/51 |
| 8,385,636 B2 * | 2/2013 | Sasaki | 382/162 |
| 8,405,673 B2 * | 3/2013 | Sasaki | 345/589 |
| 2004/0046885 A1 * | 3/2004 | Regan et al. | 348/333.11 |
| 2006/0001832 A1 * | 1/2006 | Bogdanowicz et al. | 352/38 |
| 2007/0153020 A1 * | 7/2007 | Inoue | 345/591 |
| 2007/0195408 A1 * | 8/2007 | Divelbiss et al. | 359/462 |
| 2007/0291233 A1 * | 12/2007 | Culbertson et al. | 353/34 |
| 2007/0296721 A1 * | 12/2007 | Chang et al. | 345/427 |
| 2008/0137947 A1 * | 6/2008 | Sawada et al. | 382/167 |
| 2008/0299521 A1 * | 12/2008 | Taylor et al. | 434/98 |
| 2009/0141121 A1 * | 6/2009 | Kimpe | 348/51 |
| 2009/0219487 A1 * | 9/2009 | Bogdanowicz et al. | 352/38 |

(Continued)

FOREIGN PATENT DOCUMENTS

JP    2004104777 A  *  4/2004
JP    2007189279 A  *  7/2007

OTHER PUBLICATIONS

Dodgson, Neil. "Autostereoscopic 3D Displays". Computer. (Aug. 2005) vol. 38, Is. 8: p. 31-36.*

(Continued)

*Primary Examiner* — Sath V Perungavoor
*Assistant Examiner* — Matthew J Anderson
(74) *Attorney, Agent, or Firm* — Fitzpatrick, Cella, Harper & Scinto

(57) ABSTRACT

Color correction of an autostereoscopic color display capable of displaying multiple views of one scene. Multiple viewing regions of the autostereoscopic color display are identified. The multiple viewing regions together comprise the whole of an operating viewing zone for the autostereoscopic color display. A respective plurality of color correction LUTs are constructed. At least one color correction LUT is constructed for each different viewing region. Color correction LUTs corresponding to current viewing regions are selected based on information regarding viewer location. The selected color correction LUTs are applied to the autostereoscopic color display.

32 Claims, 16 Drawing Sheets

(56) References Cited

U.S. PATENT DOCUMENTS

| | | | |
|---|---|---|---|
| 2009/0289951 A1* | 11/2009 | Matsuda | 345/589 |
| 2010/0097656 A1* | 4/2010 | Misawa et al. | 358/2.1 |
| 2010/0110069 A1* | 5/2010 | Yuan | 345/419 |
| 2011/0135195 A1* | 6/2011 | Marchesotti et al. | 382/165 |
| 2011/0141104 A1* | 6/2011 | Tin | 345/419 |
| 2013/0033585 A1* | 2/2013 | Li et al. | 348/51 |
| 2013/0141432 A1* | 6/2013 | Wang et al. | 345/419 |

OTHER PUBLICATIONS

N. A. Dodgson, "Autostereoscopic 3D displays", Computer 38(8), Aug. 2005, IEEE, pp. 31-36, 2005.

S. Pastoor, "3D Displays", 3D Videocommunication: Algorithms, concepts and real-time systems in human centred communication, eds. O. Schreer, P. Kauff and T. Sikora, pp. 235-260, 2005.

A. Boev, M. Georgiev, A. Gotchev and K. Egiazarian, "Optimized single viewer mode of multiview autostereoscopic display", Proc. EUSIPCO 2008, 2008.

N. A. Dodgson, "Analysis of the viewing zone of multi-view autostereoscopic displays", Proc. SPIE Symposium on Stereoscopic Displays and Applications XIII, pp. 254-265, 2002.

N. A. Dodgson, "Multi-View Autostereoscopic 3D Display", International Broadcasting Convention, Sep. 1999.

U.S. Appl. No. 12/637,615, filed Dec. 14, 2009 by Siu-Kei Tin.

* cited by examiner

COLOR MANAGEMENT OF AUTOSTEREOSCOPIC 3D DISPLAYS

FIELD

The present disclosure relates to color management, and more particularly relates to color management of images displayed on an autostereoscopic 3D display.

BACKGROUND

In the field of this disclosure, stereoscopic imagery is displayed by a 3D display. 3D displays typically exploit the binocular nature of human vision by using spatial and optical arrangement of display elements so that images on a 2-dimensional display can give the illusion of "depth", or an extra dimension into the image plane of the display. Stereoscopic imaging has many practical applications, including, for example, medical imaging, scientific visualization, virtual prototyping, and entertainment.

Most 3D display technologies provide "stereo parallax", which is the effect that each eye sees a different view of a scene, which in turn provides a depth cue. Such displays provide a different view of a scene to each eye.

Stereoscopic 3D displays require the use of special eyewear and provide only two views, whereas autostereoscopic 3D displays do not require special eyewear for viewing. In contrast to typical stereoscopic 3D display technologies that require special eyewear, some autostereoscopic 3D displays might also provide more than two views of a scene. By way of providing more than two views of a scene, an autostereoscopic 3D display can provide another kind of depth cue called "movement parallax". Movement parallax is the effect that a viewer sees slightly different views of an image by moving their head.

Autostereoscopic displays are ordinarily capable of displaying multiple views, either simultaneously, or sequentially over time. Autostereoscopic displays might use optics, such that each of the viewer's eyes perceives a different view of the displayed source stereoscopic image. In other words, special optical arrangement is used such that a person within a certain location with respect to the display can see only one view from each eye, and such that each eye perceives a different view of the scene. In other examples, autostereoscopic displays might use a head or eye tracking unit to determine the user's viewing position, and either alone or in combination with the use of optics such as active optics, change the displayed content of the display such that each eye receives a view that simulates stereo parallax and/or movement parallax.

Each view displayed by an autostereoscopic display is typically viewable only in a narrow range of viewing angles. These ranges of viewing angles (i.e., plural angular ranges, one each for each view) exist geometrically, regardless of the viewer. In some autostereoscopic displays, views are provided for all ranges of viewing angles regardless of whether there is a viewer. In other autostereoscopic displays, views are only provided for the ranges of viewing angles where there is a viewer.

FIG. 1 is a schematic diagram of an autostereoscopic display 1 with fixed optics using spatial multiplexing of more than one views. Fixed optics 3 (e.g., a lenticular sheet or a parallax barrier) allows a viewer to see each view of a color display pixel only in a narrow range of angles.

For example, as shown in FIG. 1, source stereoscopic imagery 4 is demultiplexed to obtain multiple views of each image frame (e.g., views 1 to 4). Autostereoscopic display 1 displays four views simultaneously, namely views one through four.

For example, optics 3 is arranged so that a viewer's eye in angular range 21 perceives view 1 of pixel 30, a viewer's eye in angular range 22 perceives view 2 of pixel 30, a viewer's eyes in angular range 23 perceives view 3 of pixel 30, and a viewer's eye in angular range 24 perceives view 4 of pixel 30. Likewise, optics 3 is arranged so that a viewer's eye in angular range 25 perceives view 1 of pixel 31, a viewer's eye in angular range 26 perceives view 2 of pixel 31, a viewer's eyes in angular range 27 perceives view 3 of pixel 31, and a viewer's eye in angular range 28 perceives view 4 of pixel 31.

Regions where certain combinations of views of pixels are visible are called viewing regions, and all of the viewing regions together comprise the whole of an operating viewing zone for the display. The geometry of the viewing regions depends on the design, e.g., optics, of the autostereoscopic display.

FIG. 1 shows multiple viewing regions. In the example illustration, the display allows a maximum of four different views (e.g., views 1 to 4). There are four viewing regions that are shaded and correspond to viewing regions where, in each one, a consistent view with good stereo parallax is seen. In other words, each shaded viewing region represents a region in which a single, consistent view of the whole image can be seen. These shaded viewing regions are optimal viewing locations for respective views, each relatively free of pseudoscopy.

Other viewing regions correspond to viewing regions where there might be an appreciable degree of pseudoscopy. For example, in one region A, both view 1 of some pixels and view 2 of some other pixels are seen, i.e., there is crosstalk among different views.

As shown in FIG. 1, and as illustrated with the location of the head of the viewer, each of the viewer's eyes fall into a viewing region of a different view, and each eye perceives a different view of the displayed image of the scene. For example, as shown in FIG. 1, the left eye perceives view 2 of the image, while the right eye perceives view 3 of the image, thus leading to a stereo parallax effect. Slight left-to-right head movement causes the eyes to move to another pair of viewing regions which provides different views, thus leading to a movement parallax effect.

The fixed optics layer 3 shown in FIG. 1 can be implemented in a number of ways. One technique is based on lenslets, where lenslets in a lenticular sheet in front of the pixels 2 refract light from the pixels such that they can be seen only in a certain range of viewing angles. Another technique for implementing the fixed optics layer is parallax barrier which is based on occlusion. Yet another variation uses parallax illumination instead of parallax barrier.

FIGS. 2A and 2B are schematic diagrams of an autostereoscopic display using active steerable optics 33 to adapt to viewer location. In the autostereoscopic display depicted in FIGS. 2A and 2B, only two views are displayed at any time. These two views are optimized based on the eye locations of the viewer, which is tracked continuously. The active optics may be implemented as steerable optical filters or, alternatively, as steerable projectors.

For example, as shown in FIGS. 2A and 2B, source stereoscopic imagery 43 is demultiplexed to obtain multiple views of each image frame (e.g., views 1 to 4). Autostereoscopic display 42 selects two views for display based on eye locations of the viewer, as determined by eye tracking unit 44.

FIG. 2A depicts the selection of views 1 and 2 based on first positions of eye locations. In FIG. 2A, optics 33 is driven so that a viewer's eye in angular range 51 perceives view 1 of pixel 40, and a viewer's eye in angular range 52 perceives view 2 of pixel 40. On the other hand, no views are visible in the angular ranges 53 and 54 since there is no viewer in those ranges.

Likewise, optics 33 is driven so that a viewer's eye in angular range 55 perceives view 1 of pixel 41, and a viewer's eye in angular range 56 perceives view 2 of pixel 41. Again, no views are visible in the angular ranges 57 and 58 since there is no viewer in those ranges.

Similar to FIG. 1, FIG. 2A shows multiple viewing regions. In the exemplary illustration, the display allows a maximum of four different views (e.g., views 1 to 4). There are four viewing regions that are shaded and correspond to viewing regions where, in each one, a consistent view relatively free of pseudoscopy is seen.

As shown in FIG. 2A, and as illustrated with the location of the head of the viewer, each of the viewer's eyes fall into a viewing region of a different view, and each eye perceives a different view of the displayed image of the scene. For example, as shown in FIG. 2A, the left eye perceives view 1 of the image, while the right eye perceives view 2 of the image, thus leading to a stereo parallax effect.

FIG. 2B depicts the result of left-to-right head movement of the viewer depicted in FIG. 2A. The left-to-right head movement is detected by eye tracking unit 44. In particular, eye tracking unit 44 detects that the viewer's left eye has moved to a viewing region from which view 3 is perceived, and the viewer's right eye has moved to a viewing region from which view 4 is perceived. In response to the detection by the eye tracking unit 44, views 3 and 4 are selected for display. Accordingly, slight left-to-right head movement causes a different pair of views to be selected for display. Thus, the slight left-to-right head movement leads to a movement parallax effect.

FIGS. 3A and 3B are schematic diagrams of an autostereoscopic display 74 using temporal multiplexing of multiple views and time switching optics 34. The autostereoscopic display 74 depicted in FIGS. 3A and 3B displays multiple views of source stereoscopic image 73 successively. In this approach, multiple views are displayed successively, one view at a time, at a high refresh rate. For example, if there are M views, and the frame rate is F frames per second, then the refresh rate of the display is typically M×F Hz. In particular, if M=9, F=120, then the refresh rate would be 1080 Hz. For example, a high speed liquid crystal display might be used to implement such an autostereoscopic display.

For example, as shown in FIGS. 3A and 3B, source stereoscopic imagery 73 is demultiplexed to obtain multiple views of each image frame (e.g., views 1 to 4). Autostereoscopic display 74 displays views 1 to 4 successively, such that only one view is displayed at a time.

FIG. 3A depicts the selection of view 1 based on a predetermined timing. In FIG. 3A, optics 34 is driven so that a viewer's eye in angular range 61 perceives view 1 of pixel 50. Likewise, optics 34 is driven so that a viewer's eye in angular range 61 perceives view 1 of pixel 51.

As shown in FIG. 3A, the viewer's left eye is located in viewing region 72, and the viewer's right eye is located in viewing region 75. Since based on timing view 1 is selected for display, view 1 of the whole image is visible in region 72, and the viewer's left eye perceives view 1. However, views 2, 3 and 4 are not visible during this time slice.

FIG. 3B depicts the selection of view 2 for display, after view 1 has been selected for display for a time of 1/(M×F) seconds. As shown in FIG. 3B, view 2 of the whole image is visible in region 75, and the viewer's right eye perceives view 2. However, views 1, 3 and 4 are not visible during this time slice. When the frame rate F is high, a viewer perceives a left image (view 1) and right image (view 2) "simultaneously" due to persistence of human vision.

SUMMARY

Despite the availability of various types of autostereoscopic displays that provide multiple views, the inventor herein has encountered difficulty in obtaining good color accuracy from such displays, and good color consistency among different views. Color inconsistency among different views results in retinal rivalry, which can cause viewing discomfort such as headache, motion sickness or even induced seizure.

The foregoing situation is addressed through the provision of stereoscopic color management that determines color LUTs for each viewing region, selects appropriate LUTs based on information regarding viewer location, and applies the selected color correction LUTs to the autostereoscopic display.

Thus, in an example embodiment described herein, multiple viewing regions of the autostereoscopic color display are identified. The multiple viewing regions together comprise the whole of an operating viewing zone for the autostereoscopic color display. A respective plurality of color correction LUTs is constructed. At least one color correction LUT is constructed for each different viewing region. Color correction LUTs corresponding to current viewing regions are selected based on information regarding viewer location. The selected color correction LUTs are applied to the autostereoscopic color display.

In one advantage, because color correction LUTs are applied to the autostereoscopic color display, color accuracy of the display can be improved, and good color consistency among different views can be obtained.

In an example embodiment, the information regarding viewer location is based on actual location of a viewer. In another example embodiment, the information regarding viewer location is based on a predesignated viewing location preference.

In an example embodiment, construction of the respective plurality of color correction LUTs involves the classification of the viewing regions into groups based on similarity in color gamut. For each group of viewing regions having similar color gamuts, a common gamut for the group is determined from all gamuts in the group. In an example embodiment, the common gamut corresponds to the largest gamut contained in each gamut within the group.

In an example embodiment, the viewing regions are identified based on geometry dependent on the optical design of the autostereoscopic color display. In an example embodiment, the viewing regions are diamond shaped. A stereo parallax is perceived by a viewer located in any pair of viewing regions, while a movement parallax is perceived when the viewer shifts position from one pair of viewing regions to another pair of viewing regions.

In an example embodiment, each color correction LUT includes a mapping from a standard color space corresponding to a view of a stereoscopic image to be displayed to a color space corresponding to one of the viewing regions. For each color correction LUT, the LUT is applied by mapping colors in the standard color space to corresponding colors in the viewing region's color space, and providing the mapped colors to the autostereoscopic color display.

This brief summary has been provided so that the nature of this disclosure may be understood quickly. A more complete understanding can be obtained by reference to the following detailed description and to the attached drawings.

DETAILED DESCRIPTION

Figure 4:
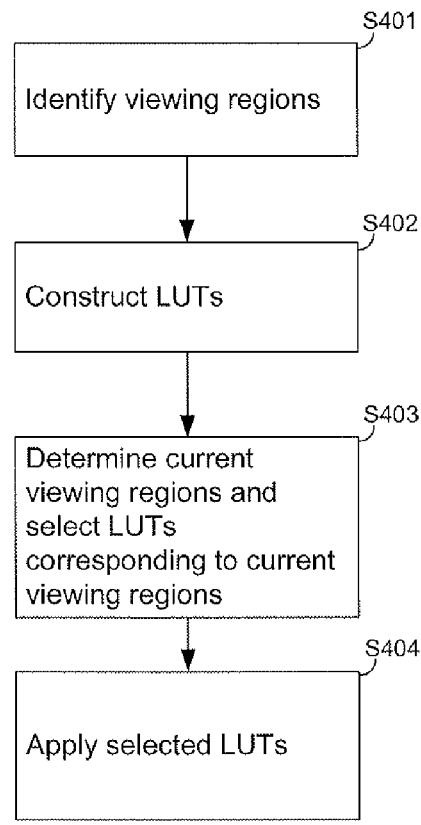
FIG. 4 is a flow diagram for explaining color correction of an autostereoscopic display according to an example embodiment.

FIG. 4 is a flow diagram for explaining color correction of an autostereoscopic display according to an example embodiment.

At step S401, multiple viewing regions of the autostereoscopic display are identified, as will be described below in more detail with respect to FIG. 5. In the example embodiment, viewing region information is generated for each identified viewing region, and the viewing region information is stored in a non-volatile memory (NVM) of the autostereoscopic display. The viewing region information for each viewing region contains geometrical data and location coordinates for the viewing region.

At step S402, a plurality of color correction LUTs (LookUp Tables) are constructed. At least one color correction LUT is constructed for each different viewing region that is identified in step S401. The color correction LUTs are stored in the NVM of the autostereoscopic display, and each LUT is stored in association with the viewing region information that identifies the corresponding viewing region.

In the example embodiment, a data processing apparatus separate from the autostereoscopic display, such as a general purpose computing machine, constructs the LUTs, and constructs LUTs at a time distinct from the time when a viewer is viewing the display. For example, at the time of manufacture or design, the data processing apparatus constructs the LUTs and then stores the LUTs in the NVM of the autostereoscopic display. In use during viewing, a separate processor of the autostereoscopic display reads the LUTs from the NVM during display of source stereoscopic images. However, in other embodiments, the autostereoscopic display constructs the LUTs, and stores the LUTs in the NVM of the autostereoscopic display, such as during a process of self-calibration.

At step S403, and in using during viewing, a processor of the autostereoscopic display reads the LUTs from the NVM (along with the associated viewing region information), receives viewer location information, determines current viewing regions based on the received viewer location information, and selects color correction LUTs corresponding to current viewing regions.

In the example embodiment, the viewer location information suggests a probable location of at least one of a viewer's eyes.

In an example embodiment in which a tracking device (e.g., an eye tracking device, a head tracking device, or the like) is used to track an actual location of at least one of the viewer's eyes, the viewer location information is received from the tracking device.

In an example embodiment in which a tracking device is not used, the viewer location information can include one or more predesignated preferred viewing locations, which are stored in the NVM of the display, and the display's processor receives the viewer location information from the NVM. In such an example embodiment in which a tracking device is not used, a user selects one or more preferred viewing locations during a user setup process for configuring the autostereoscopic display. The user manually specifies preferred viewing regions, and locations of the specified viewing regions are stored as the preferred viewing locations. Alternatively, the user activates a signal, for example an RF signal activated by a remote control, and a receiver of the autostereoscopic display triangulates the location of the user. This triangulated location is stored as the preferred viewing location.

As described above, the stored viewing region information for a viewing region contains geometrical data and location coordinates for the viewing region. The display's processor determines current viewing regions by reading the stored viewing region information from the NVM, and comparing the stored viewing region information for each viewing region with the received viewer location information. Viewing regions corresponding to matching viewing region information are selected as the current viewing regions.

The display's processor selects LUTs associated with viewing region information for current viewing regions.

At step S404, the display's processor applies the selected color correction LUT's. In the example embodiment, each color correction LUT provides a mapping from a standard color space corresponding to a view of a stereoscopic image to be displayed to a color space corresponding to one of the viewing regions. For each color correction LUT, the display's processor applies the LUT by mapping colors in the standard color space to corresponding colors in the viewing region's color space, and controlling the color display pixels of the autostereoscopic color display to display the mapped colors.

Figure 5:
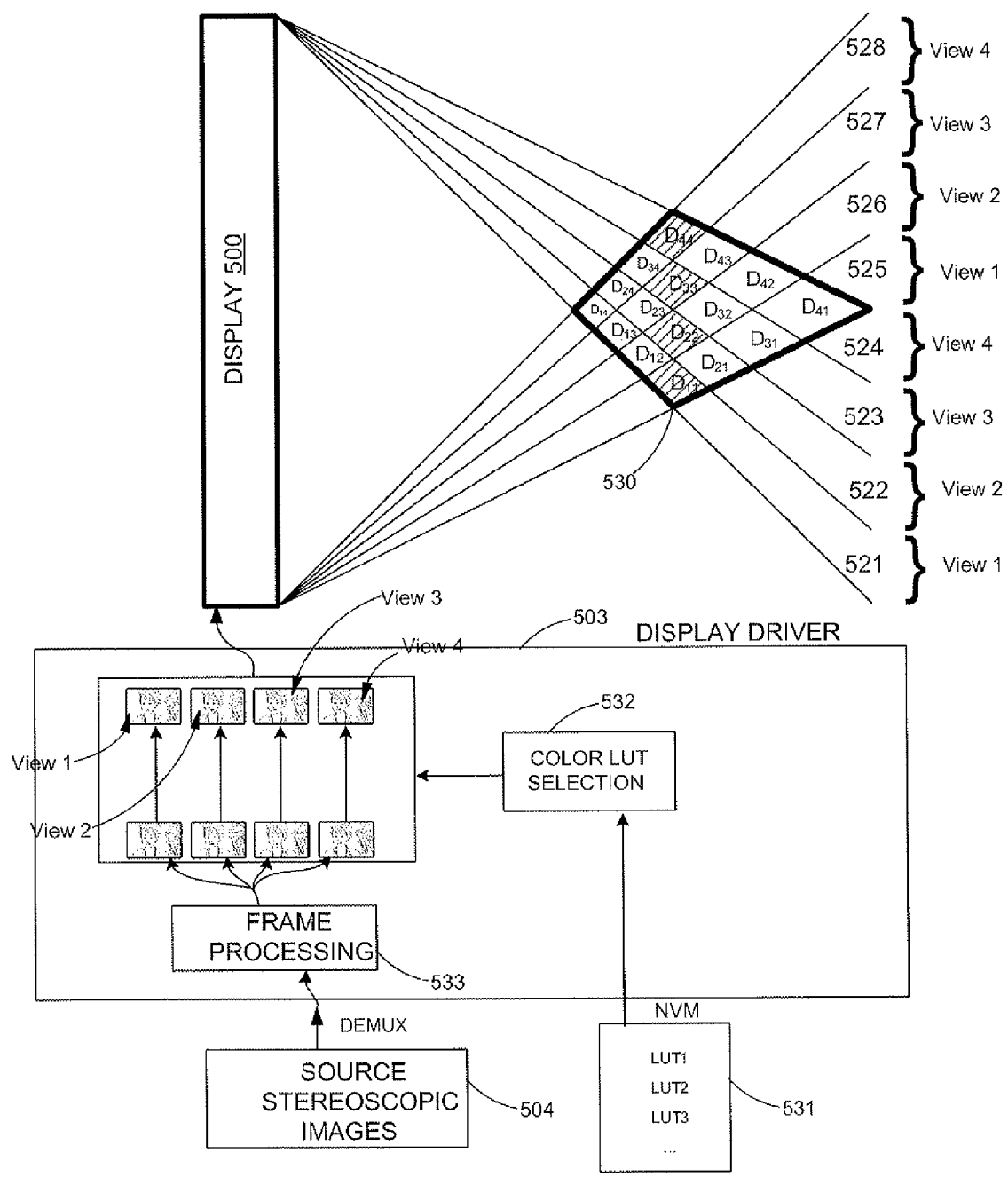
FIG. 5 is a schematic diagram of an autostereoscopic display according to an example embodiment.

FIG. 5 is a schematic diagram of an autostereoscopic display according to an example embodiment. Autostereoscopic display 500 includes a processor (not shown) and a non-volatile memory (NVM) 531. NVM 531 includes color correction LUT's and computer-executable process steps for a display driver 503, which are executed by the display's processor. Display driver 503 includes computer-executable process steps for a frame processing module 533, and a color LUT selection module 532.

Figure 1:
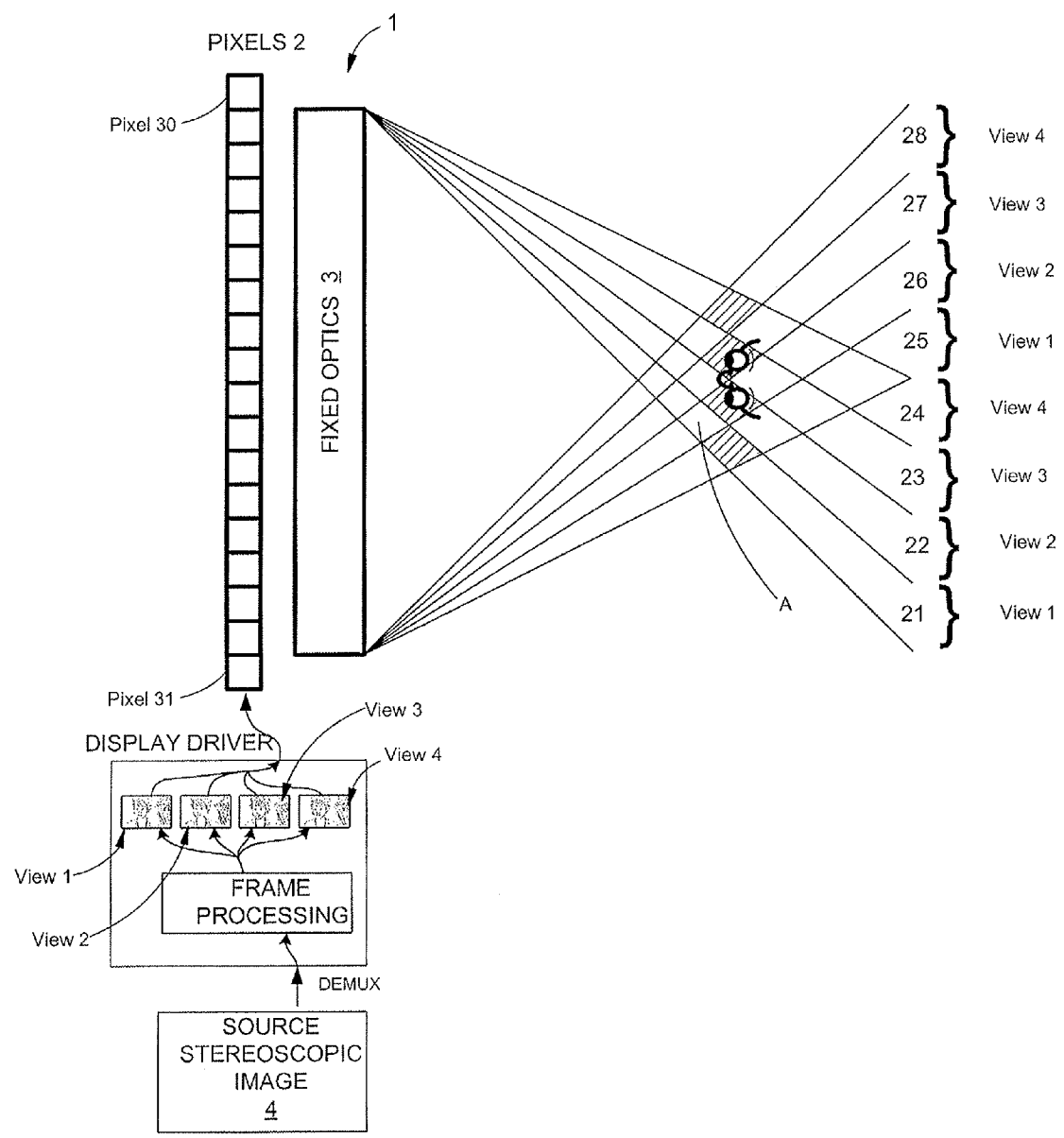
FIG. 1 is a schematic diagram of an autostereoscopic display that uses fixed optics.
Figure 2A:
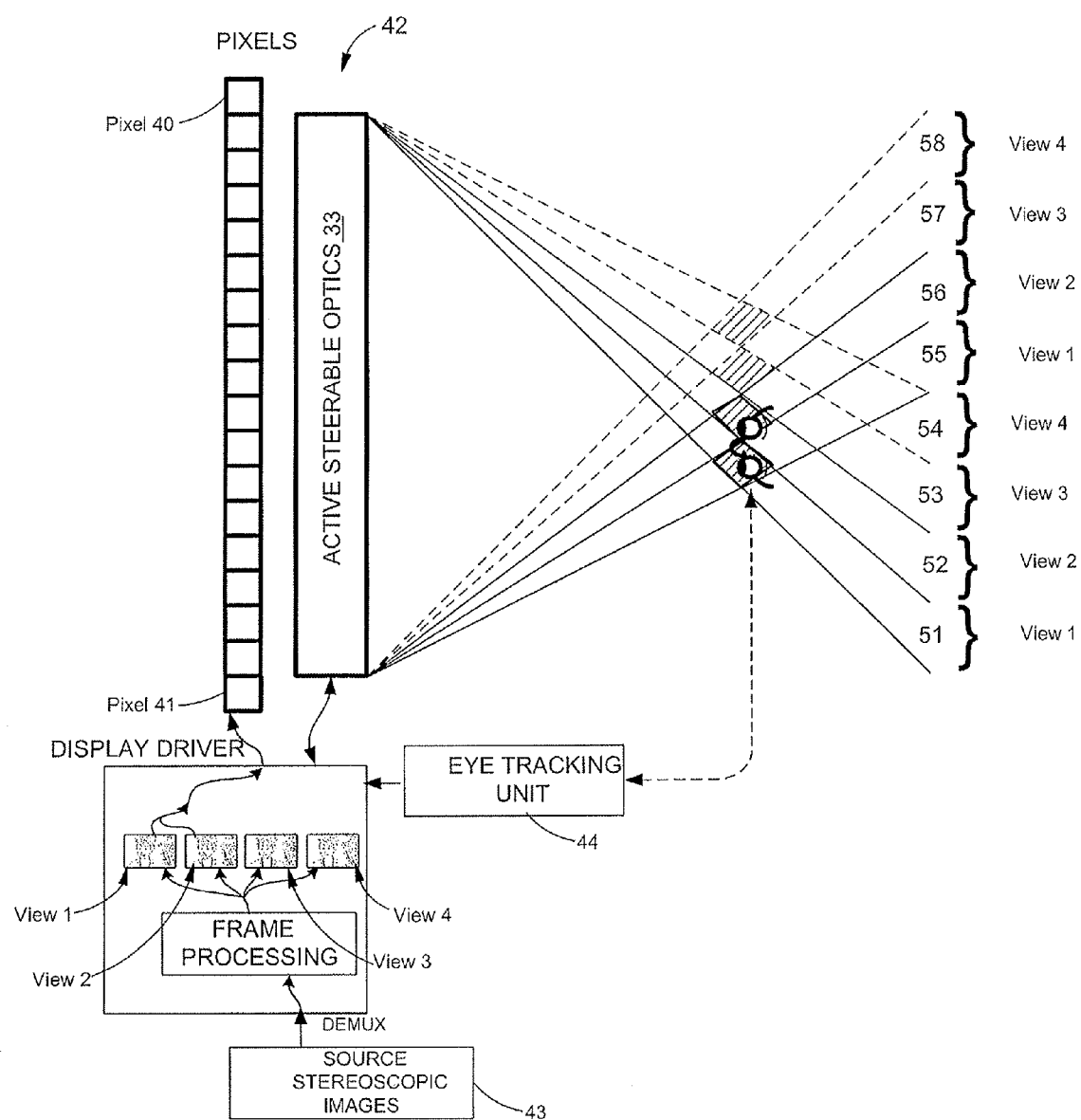
FIGS. 2A and 2B are schematic diagrams of an autostereoscopic display that uses active steerable optics.
Figure 2B:
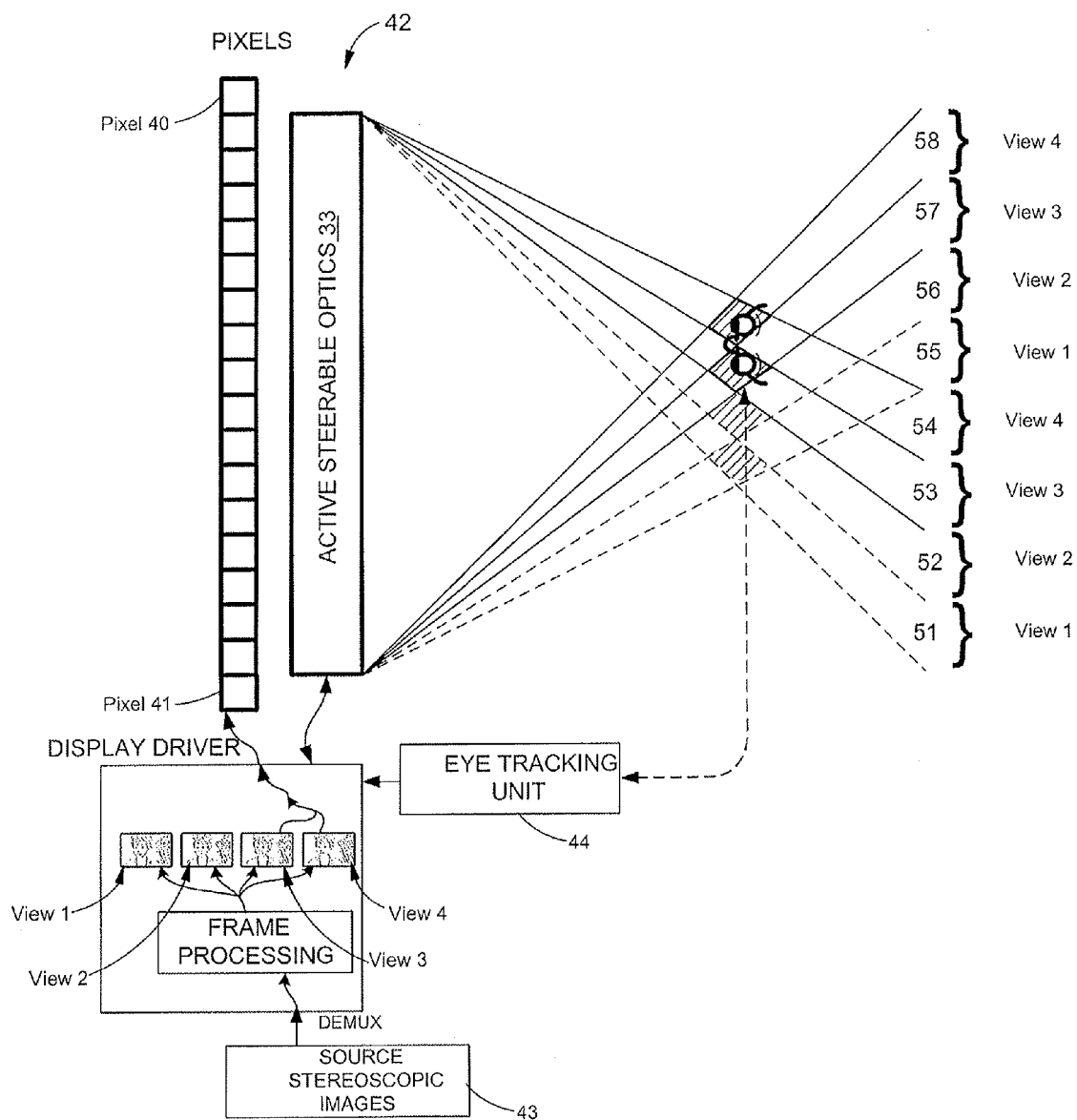
Figure 3A:
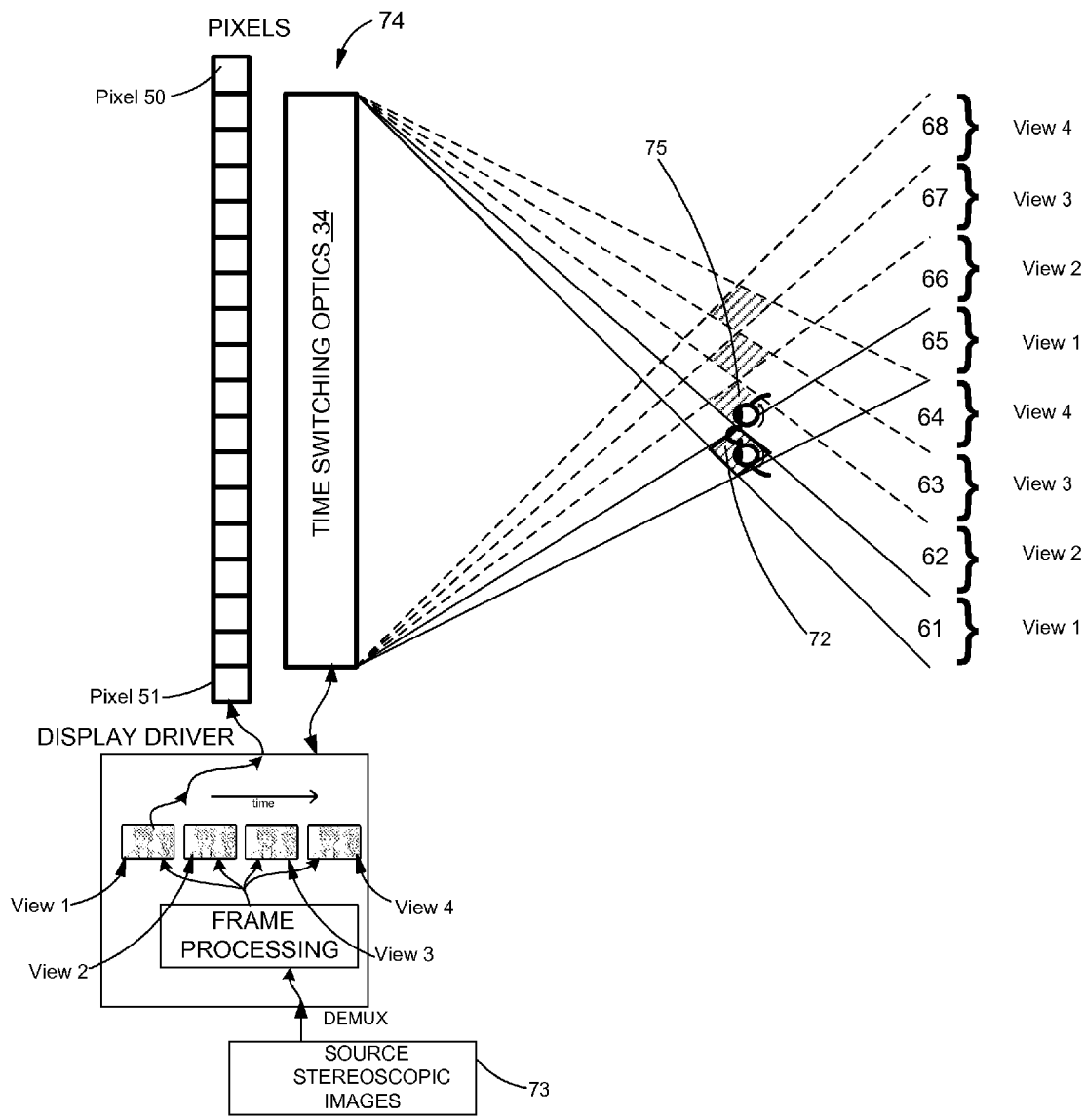
FIGS. 3A and 3B are schematic diagrams of an autostereoscopic display that uses time switching optics.
Figure 3B:
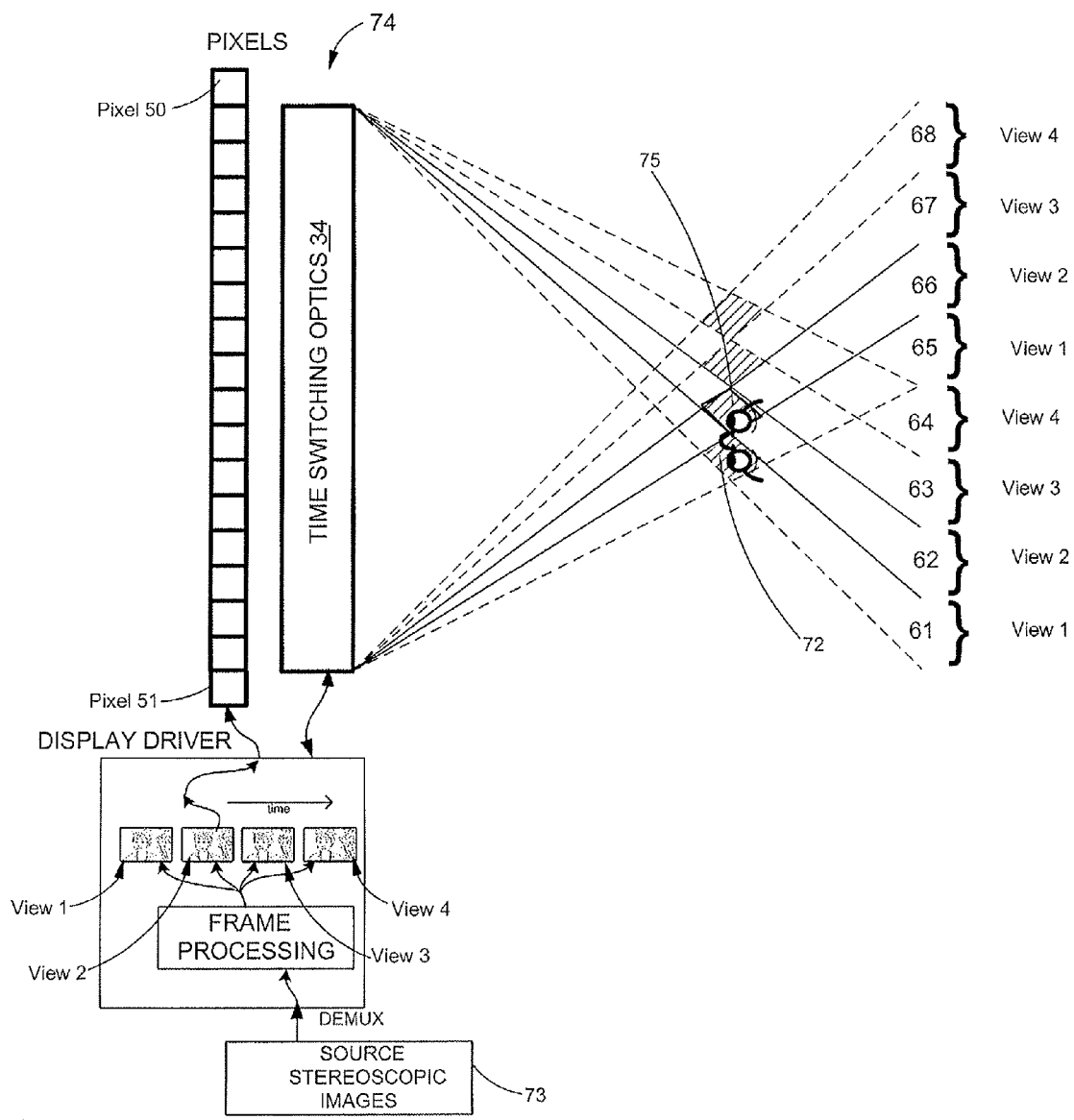

As shown in FIG. 5, frame processing module 533 demultiplexes source stereoscopic imagery 504 to obtain multiple views of each image frame (e.g., views 1 to 4) in the standard color space. The multiple views are then subjected to color correction by applying the selected color correction LUT's. Display driver 503 controls display 500 to display the multiple color corrected views of source stereoscopic image 504 on display 500. In some embodiments, all views are displayed simultaneously, as described in connection with FIG. 1 above. However, in other embodiments, all views are not displayed simultaneously, as described above in connection with FIGS. 2A, 2B, 3A, and 3B.

The viewer sees each view only in a narrow range of viewing angles. These ranges of viewing angles (i.e., angular ranges) exist geometrically, regardless of the viewer.

For example, display 500 is constructed so that a viewer's eye in angular range 521 perceives view 1 of the rightmost pixel, a viewers' eye in angular range 522 perceives view 2 of the rightmost pixel, a viewer's eyes in angular range 523 perceives view 3 of the rightmost pixel, and a viewer's eye in angular range 524 perceives view 4 of the rightmost pixel. Likewise, a viewer's eye in angular range 525 perceives view 1 of the leftmost pixel, a viewer's eye in angular range 526 perceives view 2 of the leftmost pixel, a viewer's eyes in angular range 527 perceives view 3 of the leftmost pixel, and a viewer's eye in angular range 528 perceives view 4 of the leftmost pixel.

It should be understood that for the purpose of ease of illustration, FIG. 5 only depicts the optics of the leftmost and the rightmost pixels on display 500.

Performing a similar analysis for every pixel on the display results in regions where certain combinations of views are visible. These are called viewing regions (e.g., D14, D13, D24, D12, D23, D34, D21, D32, D43, D31, D42, D41, D11, D22, D33, D44) and all of the viewing regions together comprise the whole of an operating viewing zone 530 for the display.

The geometry of the viewing regions is dependent on the optical design of autostereoscopic display 500. Thus, the multiple viewing regions of autostereoscopic display 500, and the operating viewing zone 530 for the display, are identified by analyzing the geometric optics of display 500.

As shown in FIG. 5, there are four viewing regions (e.g., D11, D22, D33, D44) that are shaded and correspond to viewing regions where, in each one, a consistent view from display 500 is seen. In other words, each shaded viewing region represents a region in which a single, consistent view of the whole image can be seen. These shaded viewing regions are the optimal viewing locations for the respective view relatively free of pseudoscopy.

In the example embodiment, the viewing regions are diamond shaped. However, in other embodiments, the viewing regions can have different shapes, depending on the optical design of the autostereoscopic display.

Other viewing regions (e.g., D14, D13, D24, D12, D23, D34, D21, D32, D43, D31, D42, D41) correspond to viewing regions where there might be an appreciable degree of pseudoscopy. For example, in region D12, view 1 of the rightmost pixel and view 2 of the leftmost pixel are seen, i.e., there is crosstalk among different views.

Operating viewing zone 530 is an area that includes all viewing regions of display 500. As shown in FIG. 5, operating viewing zone 530 is the area within the bold line that surrounds viewing regions D14, D13, D24, D12, D23, D34, D21, D32, D43, D31, D42, D41, D11, D22, D33, D44. The shaded viewing regions (e.g., D11, D22, D33, D44) represent regions in which crosstalk between the views is at a minimum. In the example embodiment, the distance between the centers of adjacent shaded viewing regions is approximately the inter-pupillary distance, which is about 65 mm on average. However, in other embodiments, the distance between the centers of adjacent shaded viewing regions can be any other distance that allows for a viewer's eyes to be positioned such that each of the viewer's eyes perceives a different view of the displayed source stereoscopic images 504.

A stereo parallax is perceived by a viewer whose eyes are located in any pair of viewing regions, and a movement parallax is perceived when the viewer shifts position from one pair of viewing regions to another pair of viewing regions.

Figure 6A:
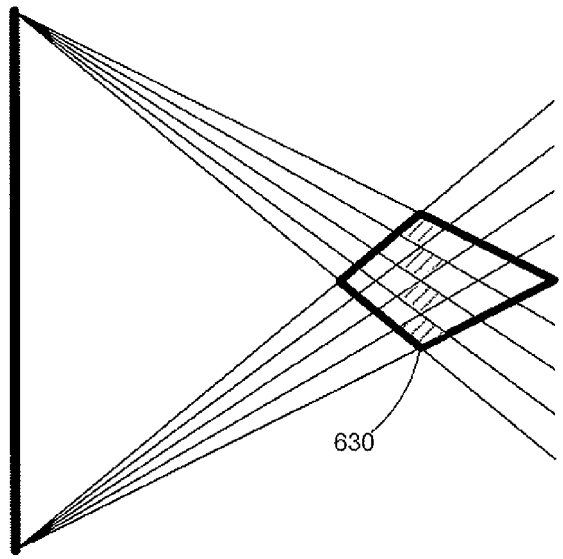
FIGS. 6A and 6B are diagrams for explaining an operating viewing zone according to an example embodiment.
Figure 6B:
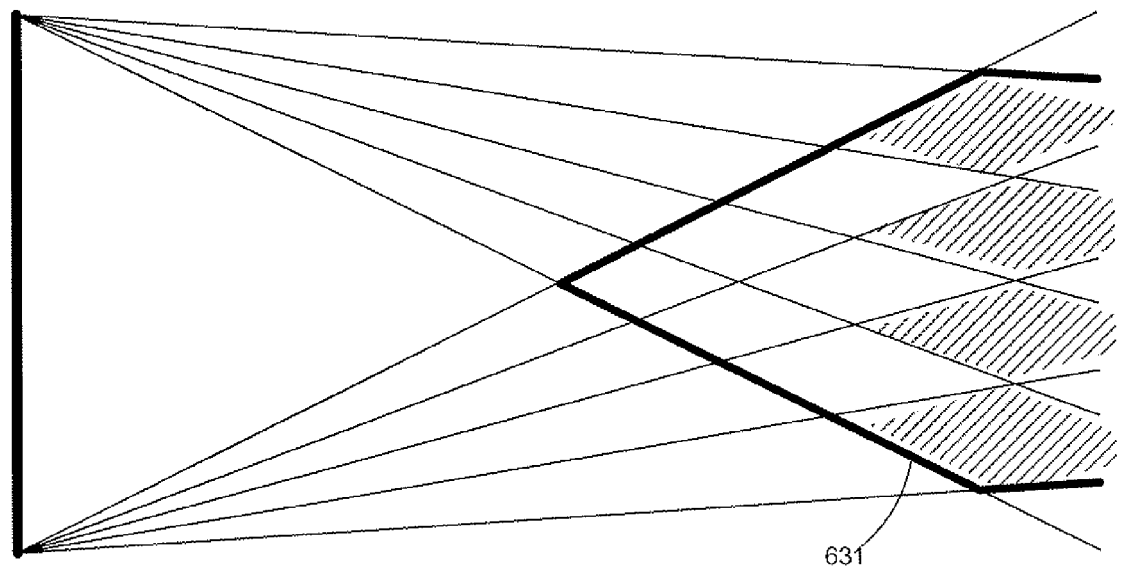

The shape of the operating viewing zone varies depending on the size of the display 500 and/or the number of views supported by the display. For example, FIG. 6A depicts a relatively small display having four supported views. The shaded viewing regions in FIG. 6A correspond to viewing regions where, in each one, a consistent view from the corresponding display is seen. As shown in FIG. 6A, the operating viewing zone 630 is relatively small, and is identified as the area within the bold lines. In comparison, FIG. 6B depicts a relatively large display (with four views shown for simplicity of illustration but typically significantly more views in practice) as compared to the display shown in FIG. 6A. As shown in FIG. 6B, the operating viewing zone 631 is relatively large (and is identified as the area included within the bold lines), as compared to the operating viewing zone 630 of FIG. 6A. The shaded viewing regions in FIG. 6B correspond to viewing regions where, in each one, a consistent view from the corresponding display is seen.

In general, the viewing condition and colorimetry of each viewing region in the operating viewing zone is different.

Reverting back to FIG. 5, color correction LUTs for each viewing region of display 500 are stored in NVM 531, and each LUT is stored in association with viewing region information that identifies the corresponding viewing region.

Color LUT selection module 532 reads the LUTs from the NVM 531 (along with the associated viewing region information), and receives viewer location information. In one example embodiment, the viewer location information includes a user's preferred viewing regions that are stored in NVM 531. In other embodiments, the viewer location information is received from an eye tracking unit.

Color LUT selection module 532 determines current viewing regions by comparing the stored viewing region information for each viewing region with the received viewer location information. Color LUT selection module 532 then selects LUTs associated with viewing region information for current viewing regions.

For each selected color correction LUT, color LUT selection module 532 applies the selected color correction LUT by mapping colors in the standard color space to corresponding colors in the viewing region's color space. Display driver 503 controls the color display 500 to display the mapped colors.

Figure 7:
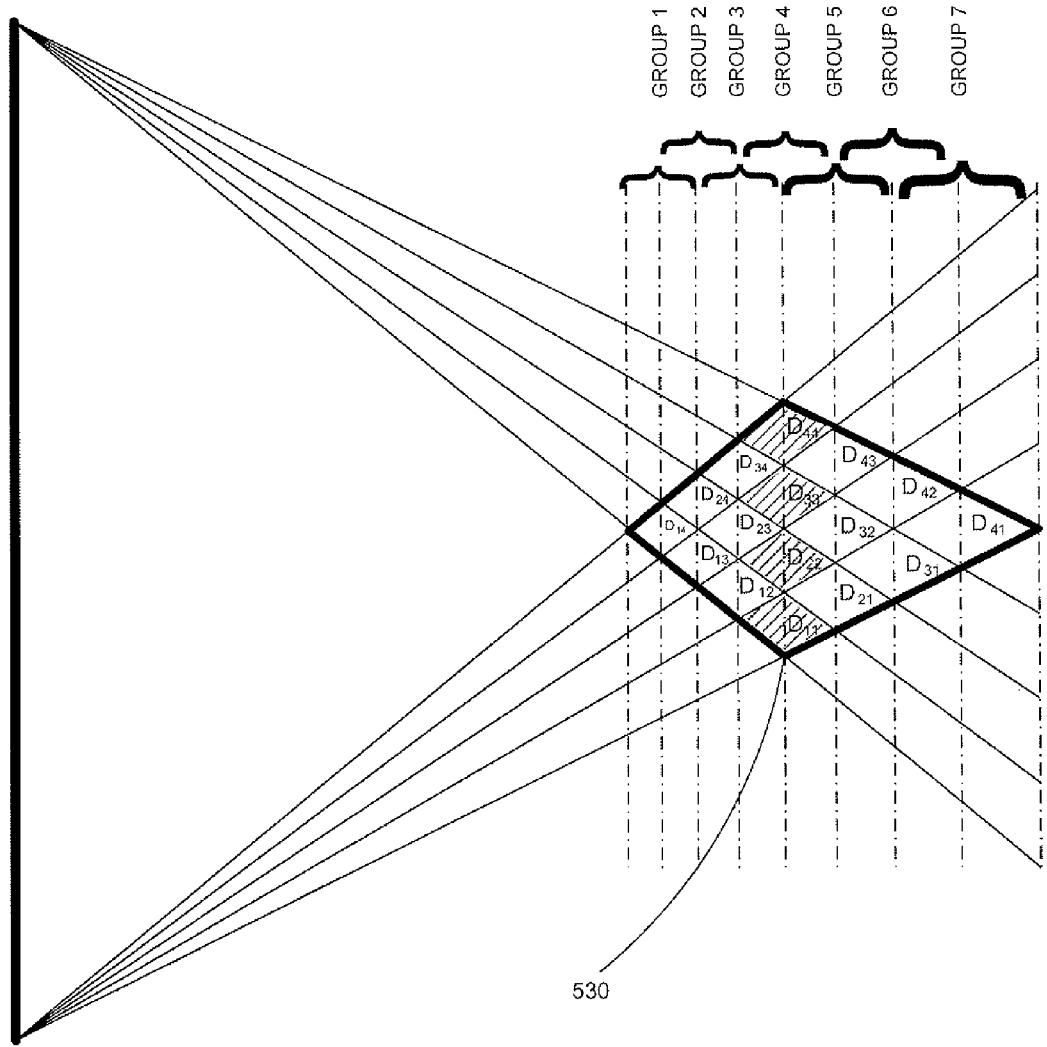
FIG. 7 is a diagram for explaining classification of viewing regions according to an example embodiment.
Figure 8:
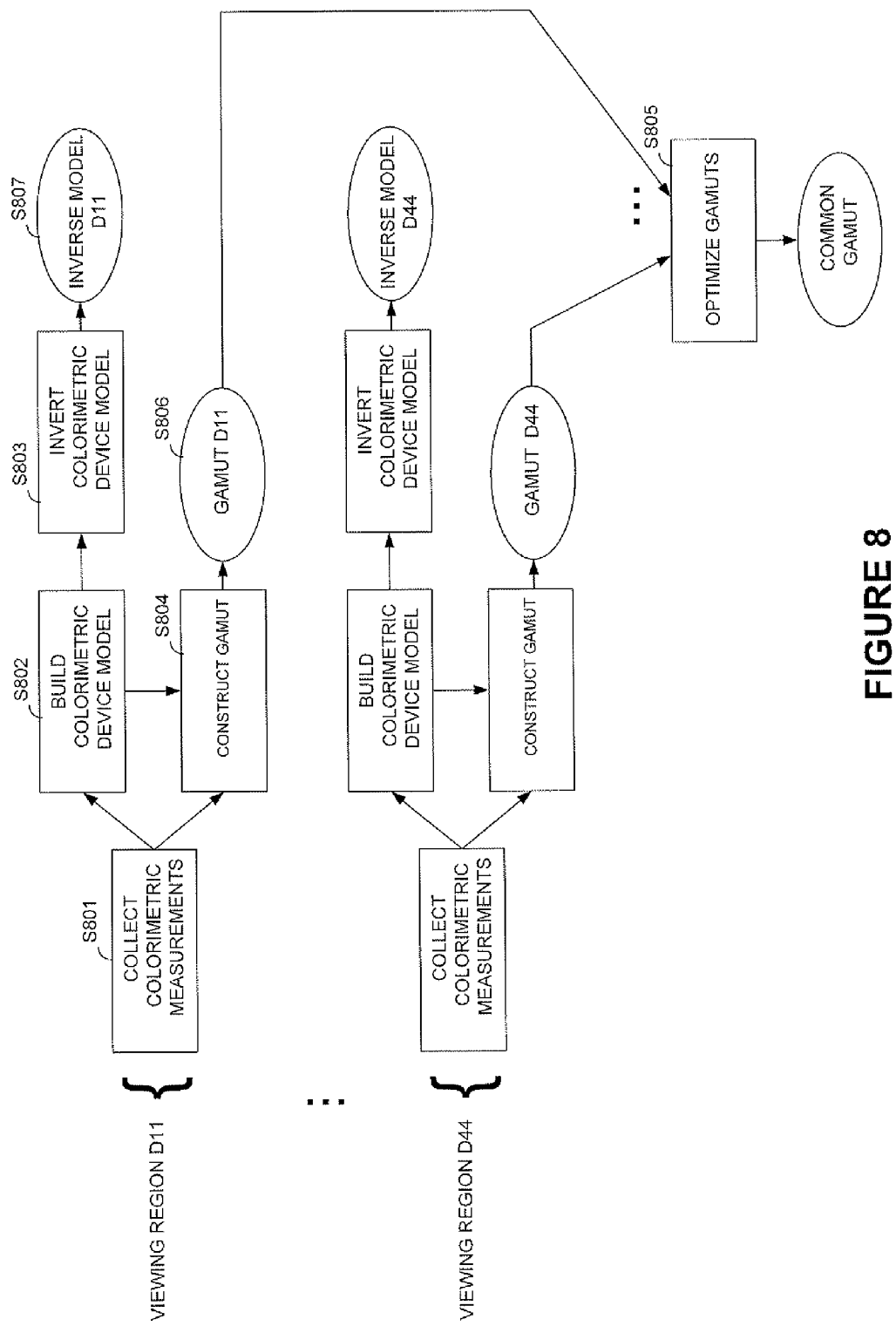
FIG. 8 is a flow diagram for explaining construction of a common gamut according to an example embodiment.
Figure 9:
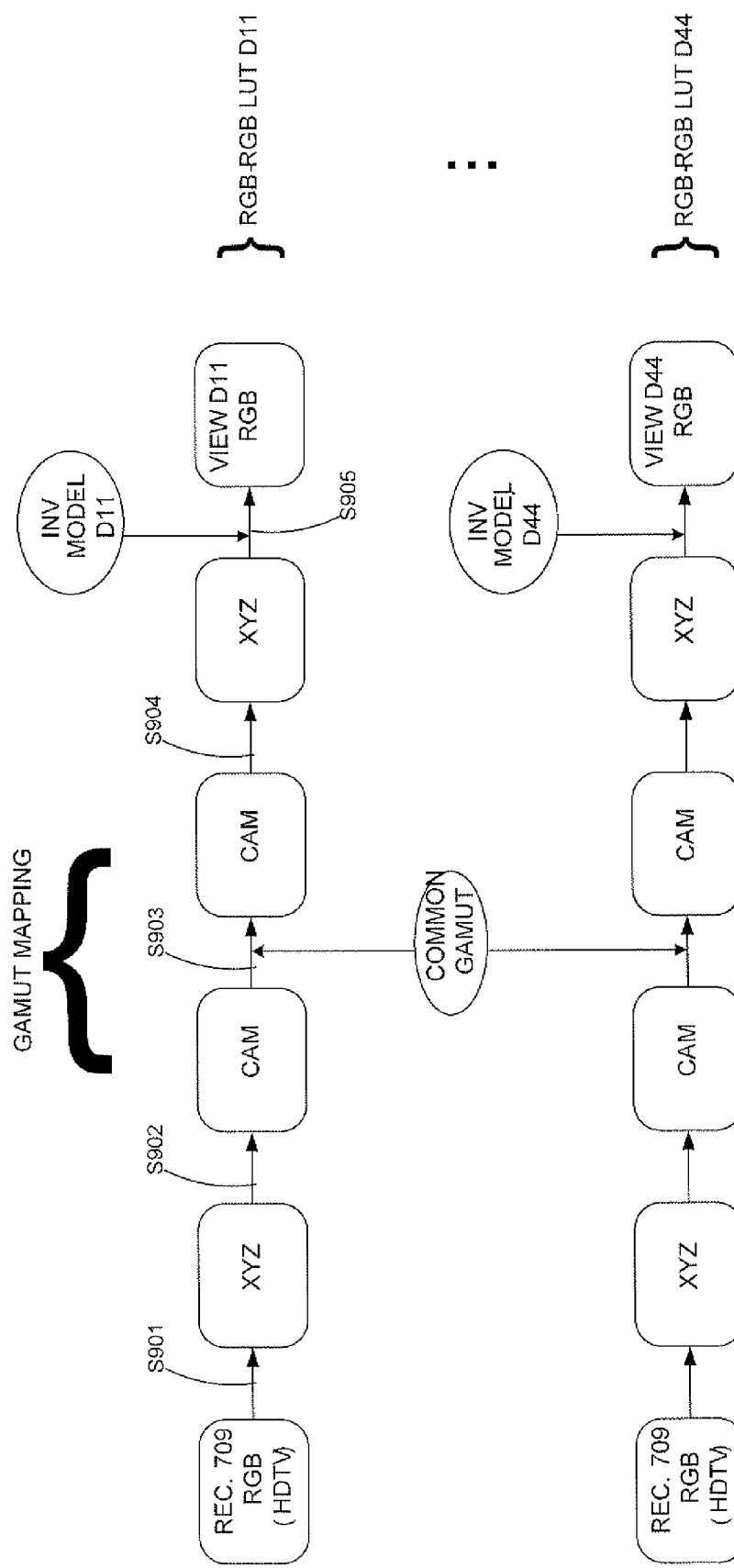
FIG. 9 is a diagram for explaining construction of a color correction LUT according to an example embodiment.

FIGS. 7, 8 and 9 are diagrams for explaining constructing step S402 of FIG. 4 in more detail. To construct the color correction LUTs, the viewing regions are classified into groups based on similarity in color gamut. For example, FIG. 7 shows the grouping for the operating viewing zone 530 from the example embodiment of FIG. 5. As shown in FIG. 7, the classification of viewing regions is based on viewing distance from the display, which affects the color gamut. For example, as shown in FIG. 7, all viewing regions that are at a same distance from the autostereoscopic display are classified into the same group, since viewing regions at a same distance from the display ordinarily have similar color gamuts. In particular, viewing regions D11, D22, D33 and D44 are classified into Group 4. In other embodiments, classification of viewing regions based on other knowledge of the gamuts is used.

For each group of viewing regions having similar gamuts, a common gamut is determined for the group, from all gamuts in the group.

FIG. 8 is a diagram for explaining a determination of a common gamut for a group of viewing regions for which color correction processing is to be performed. FIG. 8 depicts the determination of a common gamut for Group 4 of FIG. 7, but the process depicted in FIG. 8 applies to the determination of a common gamut for any group for which color correction processing is to be performed.

The steps illustrated in FIG. 8 (which are included in the constructing step S402 of FIG. 4) are performed by the data processing apparatus (e.g., general purpose computing machine) that performs step S402. In the example embodiment, the data processing apparatus is separate from the autostereoscopic display. In other embodiments, the autostereoscopic display's processor performs the steps illustrated in FIG. 8.

For each viewing region, colorimetric measurements are collected. As shown in FIG. 8, colorimetric measurements are collected for viewing region D11 of Group 4 at step S801. In the example embodiment, the colorimetric measurements are collected by controlling all of the color display pixels to display a sequence of colors spanning the whole gamut, a single color at a time (i.e., the full display screen displays a single color at a time), and colorimetric measurements are performed using a colorimeter. In particular, for each viewing region, the colorimeter is set up within the viewing region, and the colorimeter performs colorimetric measurements from within the viewing region. In the example embodiment, to account for crosstalk between different views, each color display pixel is controlled to display the same color for all views, and all views are simultaneously displayed.

At step S802, the data processing apparatus uses the colorimetric measurements collected for viewing region D11 to build a colorimetric forward device model for viewing region D11. Device modeling based on colorimetric measurements is described in U.S. Pat. No. 7,085,414, the contents of which are hereby incorporated by reference as if fully stated herein.

At step S804, the data processing apparatus constructs a color gamut 806 in a color appearance space using both the colorimetric measurements collected in step S801 and the forward device model constructed in step S802. In other embodiments, the data processing apparatus constructs a color gamut in a color appearance space using the colorimetric measurements collected in step S801 or the forward device model constructed in step S802.

At step S803, the data processing apparatus inverts the forward device model constructed in step S802 to generate an inverse model 807 for viewing region D11.

Steps S801 to S804 are repeated for each of the remaining three viewing regions in Group 4, to generate an inverse model and a color gamut for each of the viewing regions.

At step S805, the data processing apparatus analyzes the four gamuts for the respective viewing regions within Group 4 to determine a common gamut for the group. The use of a common gamut allows the views perceived within the respective viewing regions to be rendered by a common gamut mapping, thus providing a consistent appearance among all of the views. In the example embodiment, the common gamut corresponds to the largest gamut contained in each gamut within the group. In other words, the common gamut corresponds to the intersection of all the gamuts within the group.

FIG. 9 is a diagram for explaining a process for constructing color correction LUTs using the common gamut. FIG. 9 depicts the construction of color correction LUTs for viewing regions in Group 4 of FIG. 7, but the process depicted in FIG. 9 applies to the construction of color correction LUTs for any group for which color correction processing is to be performed The steps illustrated in FIG. 9 (which are included in the constructing step S402 of FIG. 4) are performed by the data processing apparatus (e.g., general purpose computing machine) that performs step S402. In the example embodiment, the data processing apparatus is separate from the autostereoscopic display. In other embodiments, the autostereoscopic display's processor performs the steps illustrated in FIG. 9.

In the example embodiment, at step S901, a forward device model for a standard color space is used to convert color data (for a view to be perceived by a viewer's eye located in viewing region D11) that is in the standard color space to color data in a device independent color space. In the example embodiment, the standard color space is the Rec. 709 RGB color space for HDTV (high definition television), and the device independent color space is the CIEXYZ color space.

At step S902, a forward transform of a color appearance model for the standard color space (e.g., Rec. 709 RGB color space for HDTV) converts the color data in the device independent color space to color data in a color appearance space.

At step S903, a gamut mapping algorithm is used to map the color data output in step S902 to the common gamut determined in FIG. 8.

At step S904, an inverse transform of a color appearance model for viewing region D11 converts the gamut mapped color data to a device independent color space (e.g., CIEXYZ color space). In the example embodiment, the color appearance model for each viewing region is created based on measurements, such as, for example, white point measurements, of the display from within the viewing region.

At step S905, the inverse model for viewing region D11 (generated in FIG. 8) converts the gamut mapped data in the device independent color space to a color space corresponding to viewing region D11. In the example embodiment, the color space of each viewing region is an RGB color space. The color data in the color space of viewing region D11 and the corresponding data in the standard color space are included in the LUT for viewing region D11.

Steps S901 to S905 are repeated for each of the remaining three viewing regions in Group 4, to generate LUTs for each viewing region.

Thus, each color correction LUT represents a color transform from a standard RGB space, such as the Rec. 709 RGB space for HDTV, to an RGB color space corresponding to a respective viewing region. As shown in FIG. 9, each LUT within a group uses the same gamut mapping constructed from the common gamut, while the rendered color (i.e., the gamut mapped color) is converted to a particular viewing region's RGB color space using the corresponding inverse model for the viewing region.

Figure 10:
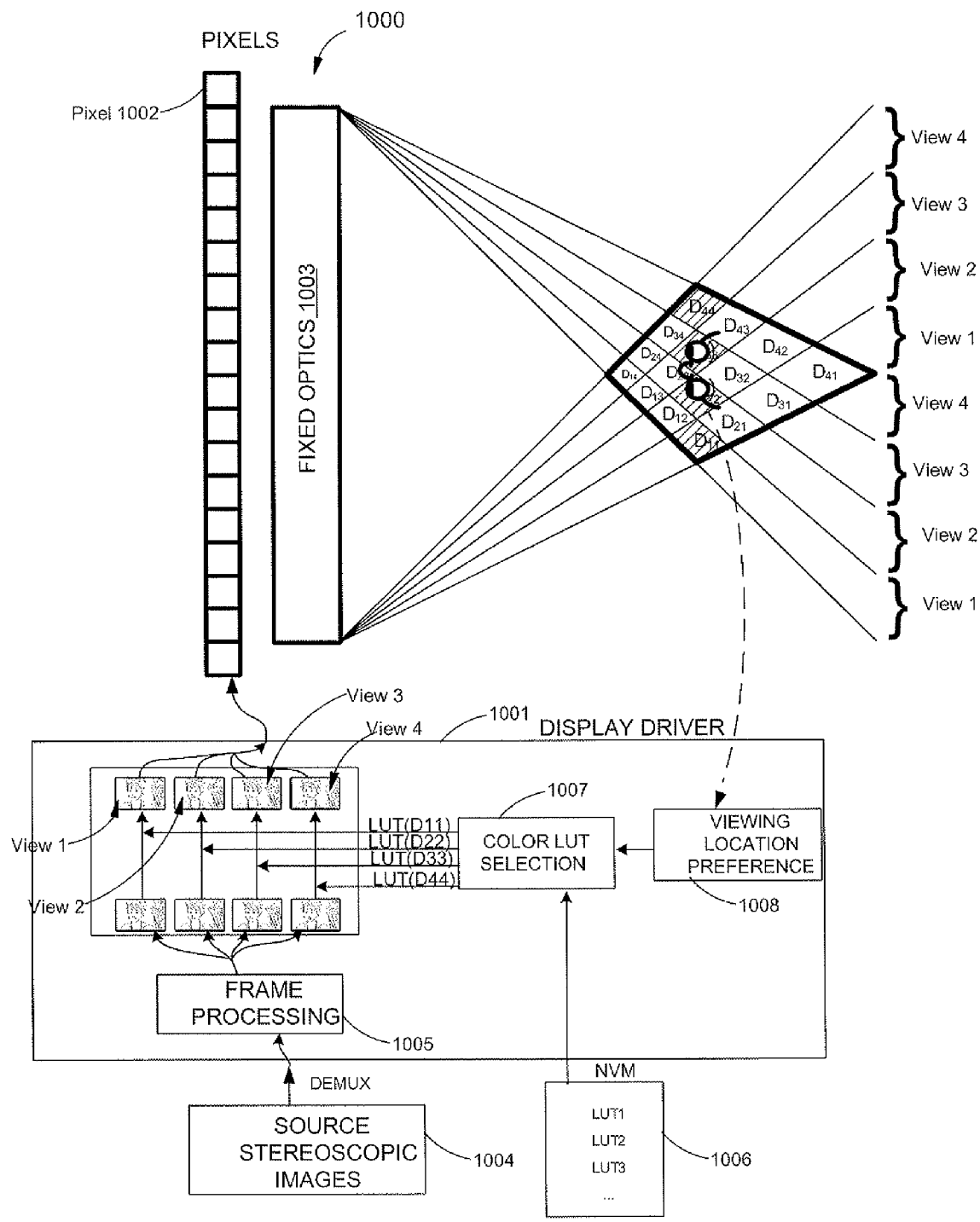
FIG. 10 is a schematic diagram of an autostereoscopic display that uses fixed optics according to an example embodiment.

FIG. 10 is a schematic diagram of an autostereoscopic display 1000 that is similar to display 500 of FIG. 5. Autostereoscopic display 1000 uses fixed optics to achieve spatial multiplexing of two or more views. Fixed optics 1003 (e.g., a lenticular sheet or a parallax barrier) allows a viewer to see each view of a color display pixel only in a narrow range of angles. Autostereoscopic display 1000 includes a processor (not shown) and a non-volatile memory (NVM) 1006. NVM 1006 includes computer-executable process steps for a display driver 1001, which are executed by the display's processor. Display driver 1001 includes computer-executable process steps for a frame processing module 1005, a color LUT selection module 1007, and a viewing location preference module 1008.

Color correction LUTs for viewing regions of display 1000 are stored in NVM 1006, and each LUT is stored in association with viewing region information that identifies the corresponding viewing region For example, as shown in FIG. 10, source stereoscopic imagery 1004 is demultiplexed by frame processing module 1005 to obtain multiple views of each image frame (e.g., views 1 to 4) in the standard color space.

Viewer location preference module 1008 reads the viewer location information from NVM 1006. The viewer location information includes preferred viewing regions selected by a user during a user setup process of the display 1000. In the example embodiment depicted in FIG. 10, the preferred viewing regions are D11, D22, D33 and D44.

Color LUT selection module 1007 reads the LUTs from the NVM 1006 (along with the associated viewing region information), and receives viewer location information from viewing location preference module 1008. Color LUT selection module 1007 determines preferred viewing regions by comparing the stored viewing region information for each viewing region with the received viewer location information. The preferred viewing regions are treated as current viewing regions in the embodiment depicted in FIG. 10. Color LUT selection module 1007 then selects LUTs associated with viewing region information for preferred viewing regions. In particular, since the preferred viewing regions read by viewer location preference module 1008 are viewing regions D11, D22, D33 and D44, color LUT selection module 1007 selects LUTs associated with viewing regions D11, D22, D33, and D44.

For each color correction LUT, color LUT selection module 1007 applies the selected color correction LUT by mapping colors in the standard color space to corresponding colors in the viewing region's color space. Display driver 1001 controls the color display pixels 1002 of the autostereoscopic color display 1000 to display the mapped colors.

Figure 11:
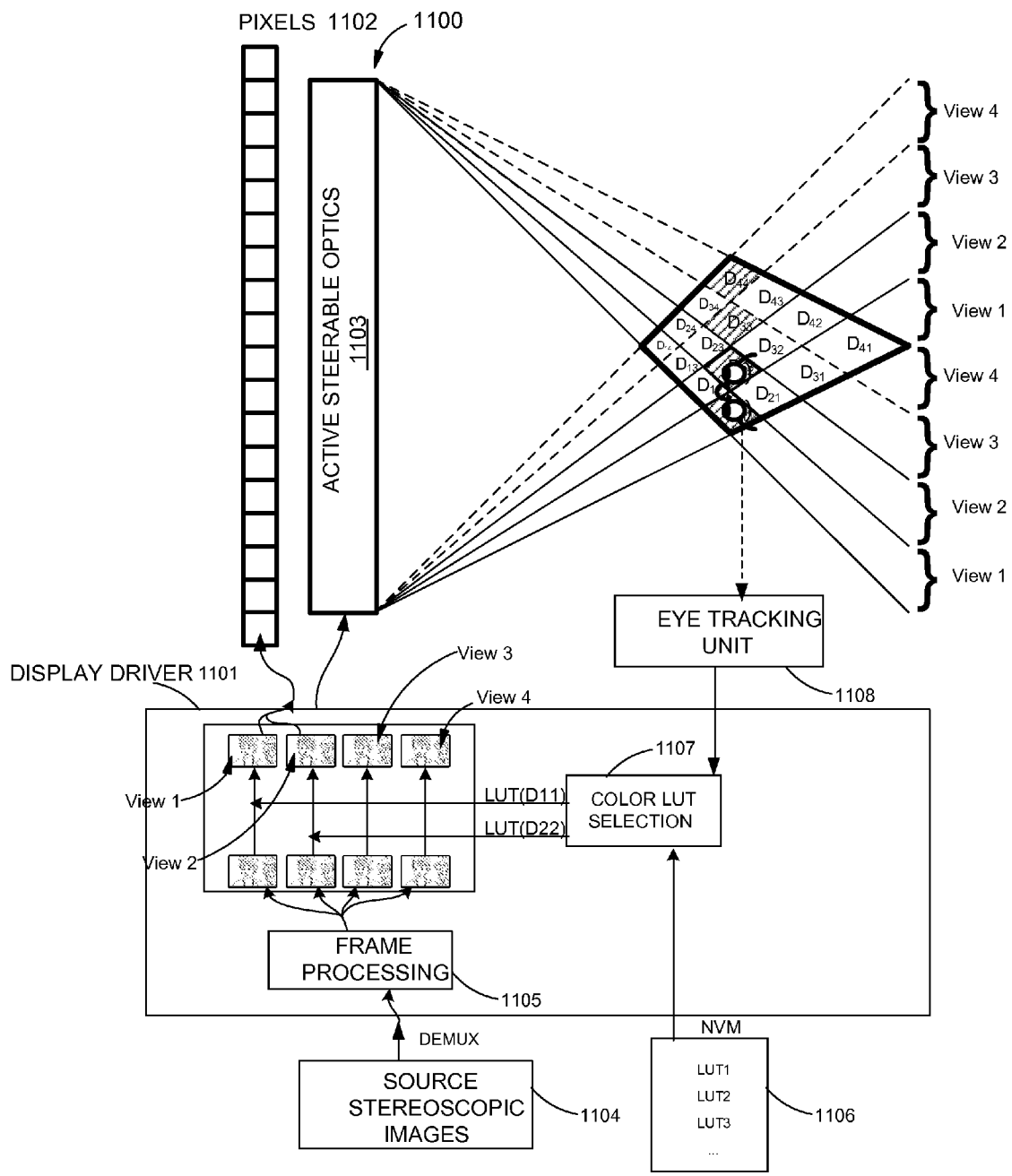
FIG. 11 is a schematic diagram of an autostereoscopic display that uses active steerable optics according to an example embodiment.

FIG. 11 is a schematic diagram of an autostereoscopic display similar to display 500 of FIG. 5. Autostereoscopic display 1100 uses active steerable optics that adapts to viewer location. In the autostereoscopic display 1100, only two views are displayed at any time. These two views are optimized based on the eye locations of the viewer, which is tracked continuously by eye tracking unit 1108. The active optics 1103 may be implemented as steerable optical filters or, alternatively, as steerable projectors.

Autostereoscopic display 1100 includes a processor (not shown) and a non-volatile memory (NVM) 1106. NVM 1106 includes computer-executable process steps for a display driver 1101, which are executed by the display's processor. Display driver 1101 includes computer-executable process steps for a frame processing module 1105, and a color LUT selection module 1107.

For example, as shown in FIG. 11, source stereoscopic imagery 1104 is demultiplexed by frame processing module 1105 to obtain four views of each image frame (e.g., views 1 to 4) in the standard color space, two of which are selected for display.

Color correction LUTs for viewing regions of display 1100 are stored in NVM 1106, and each LUT is stored in association with viewing region information that identifies the corresponding viewing region.

Color LUT selection module 1107 reads the LUTs from the NVM 1106 (along with the associated viewing region information), and receives viewer location information from eye tracking unit 1108. Color LUT selection module 1107 determines current viewing regions by comparing the stored viewing region information for each viewing region with the received viewer location information.

Viewing regions corresponding to matching viewing region information are selected as the current viewing regions (i.e., viewing regions in which viewer's eyes are located). Color LUT selection module 1107 then selects LUTs associated with viewing region information for current viewing regions.

For each color correction LUT, color LUT selection module 1107 applies the selected color correction LUT by mapping colors in the standard color space to corresponding colors in the viewing region's color space. Display driver 1101 controls the color display pixels 1102 of the autostereoscopic color display 1100 to display the mapped colors.

For example, as shown in FIG. 11, eye tracking unit 1108 detects that the viewer's left eye is in viewing region D11, and the viewer's right eye is in viewing region D22. In response to the detection by the eye tracking unit 1108, views 1 and 2 are selected for display such that views 1 and 2 are visible in viewing regions D11 and D12, respectively. Since based on eye location views 3 and 4 are not selected for display, no image is visible in viewing regions D33 and D44.

Color LUT selection module 1107 selects LUTs associated with viewing regions D11 and D22, which correspond to the viewing regions in which the viewer's eyes are located, as determined by eye tracking unit 1108. Color LUT selection module 1107 applies the LUTs for viewing regions D11 and D22 to views 1 and 2, respectively.

If the viewer's head moves from left to right, such that, for example, the left eye is in viewing region D33 and the right eye is in viewing region D44, eye tracking unit 1108 detects that movement. In response to the detection by the eye tracking unit 1108, views 1 and 2 are no longer selected for display, and views 3 and 4 are selected for display such that views 3 and 4 are visible in viewing regions D33 and D44, respectively. Since views 1 and 2 are no longer selected for display after the viewer's movement, no image is visible in viewing regions D11 and D22. In this case, color LUT selection module 1107 selects LUTs associated with viewing regions D33 and D44, which correspond to the viewing regions in which the viewer's eyes are located, as determined by eye tracking unit 1108. Color LUT selection module 1107 applies the LUTs for viewing regions D33 and D44 to views 3 and 4, respectively.

Figure 12:
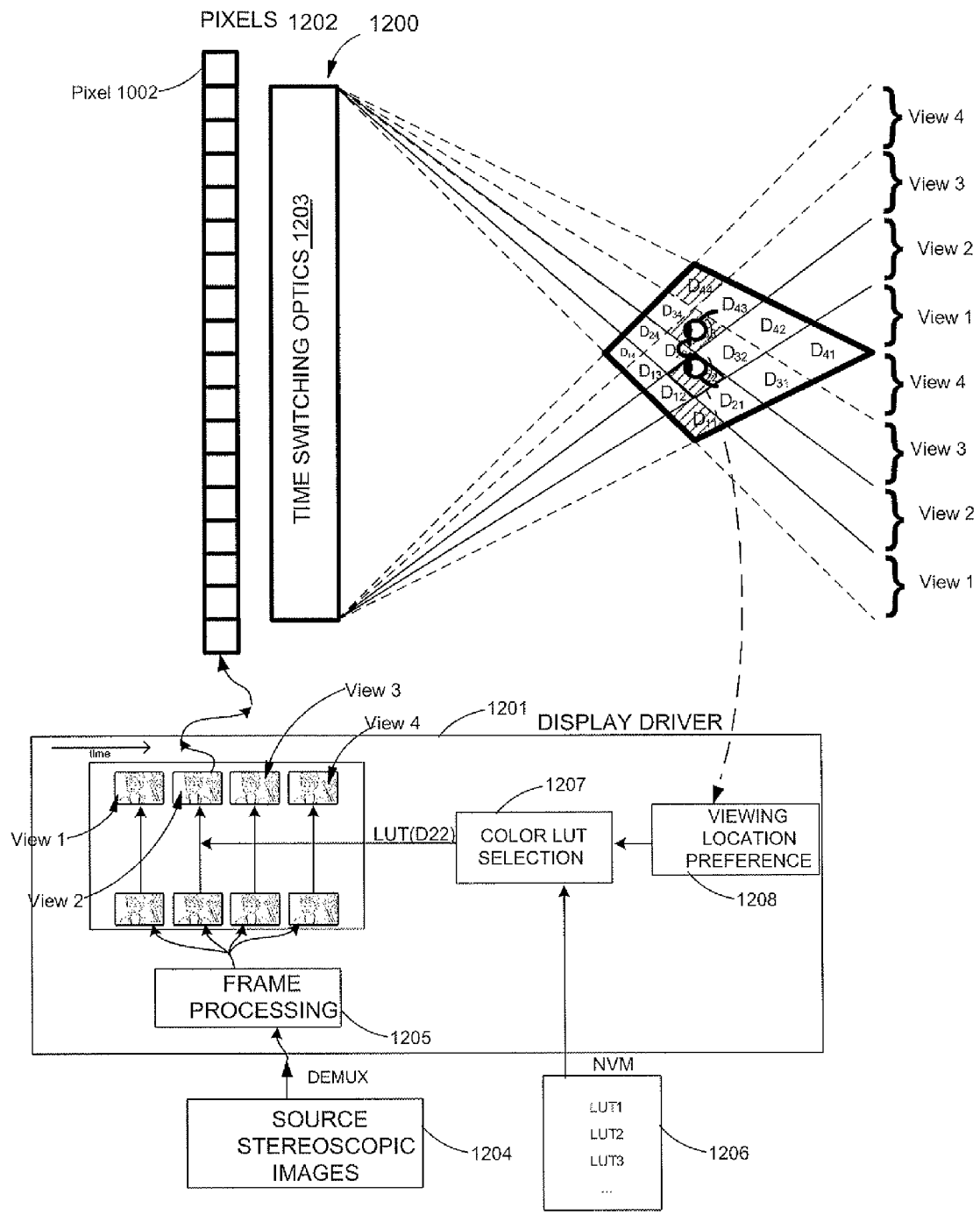
FIG. 12 is a schematic diagram of an autostereoscopic display that uses time switching optics according to an example embodiment.

FIG. 12 is a schematic diagram of an autostereoscopic display 1200 that is similar to display 500 of FIG. 5. Autostereoscopic display 1200 uses time switching optics to achieve temporal multiplexing of multiple views. In the autostereoscopic display 1200, only one view is displayed at any time.

Autostereoscopic display 1200 includes a processor (not shown) and a non-volatile memory (NVM) 1206. NVM 1206 includes computer-executable process steps for a display driver 1201, which are executed by the display's processor. Display driver 1201 includes computer-executable process steps for a frame processing module 1205, a color LUT selection module 1207, and a viewing location preference module 1208.

For example, as shown in FIG. 12, source stereoscopic imagery 1204 is demultiplexed by frame processing module 1205 to obtain four views of each image frame in the standard color space. Display driver 1201 displays each of the four views sequentially, such that only one view is displayed at any time.

Color correction LUTs for viewing regions of display 1200 are stored in NVM 1206, and each LUT is stored in association with viewing region information that identifies the corresponding viewing region.

Color LUT selection module 1207 reads the LUTs from the NVM 1206 (along with the associated viewing region information), and receives viewer location information from viewer location preference module 1208. Color LUT selection module 1207 determines preferred viewing regions by comparing the stored viewing region information for each viewing region with the received viewer location information. The preferred viewing regions are treated as current viewing regions in the embodiment depicted in FIG. 12. Color LUT selection module 1207 selects LUTs associated with viewing region information for the preferred viewing regions. In particular, since the preferred regions read by viewer location preference module 1208 are viewing regions D11, D22, D33 and D44, color LUT selection module 1207 selects LUTs associated with viewing regions D11, D22, D33, D44.

Color LUT selection module 1207 applies the selected color correction LUTs sequentially to each view in succession of timed lapses by mapping colors in the standard color space to corresponding colors in the viewing region's color space. Display driver 1201 controls the color display pixels 1202 of the autostereoscopic color display 1200 to display the mapped colors.

For example, as shown in FIG. 12, view 2 is currently slated for display such that view 2 is visible in viewing region D22. Since based on timing views 1, 3 and 4 are not slated for display, no image is visible in viewing regions D11, D33 and D44.

In the example embodiment depicted in FIG. 12, the preferred viewing regions are D11, D22, D33 and D44, and D22 is the viewing region from which view 2 is perceived. Accordingly, color LUT selection module 1207 applies the LUT for viewing region D22 to view 2.

After view 2 has been displayed for a predetermined duration, the next view, i.e., view 3, is slated for display such that view 3 is visible in viewing region D33. Since at this new time views 1, 2 and 4 are not slated for display, no image is visible into viewing regions D11, D22 and D44. At this time, color LUT selection module applies the LUT for viewing region D33 to view 3.

Figure 13:
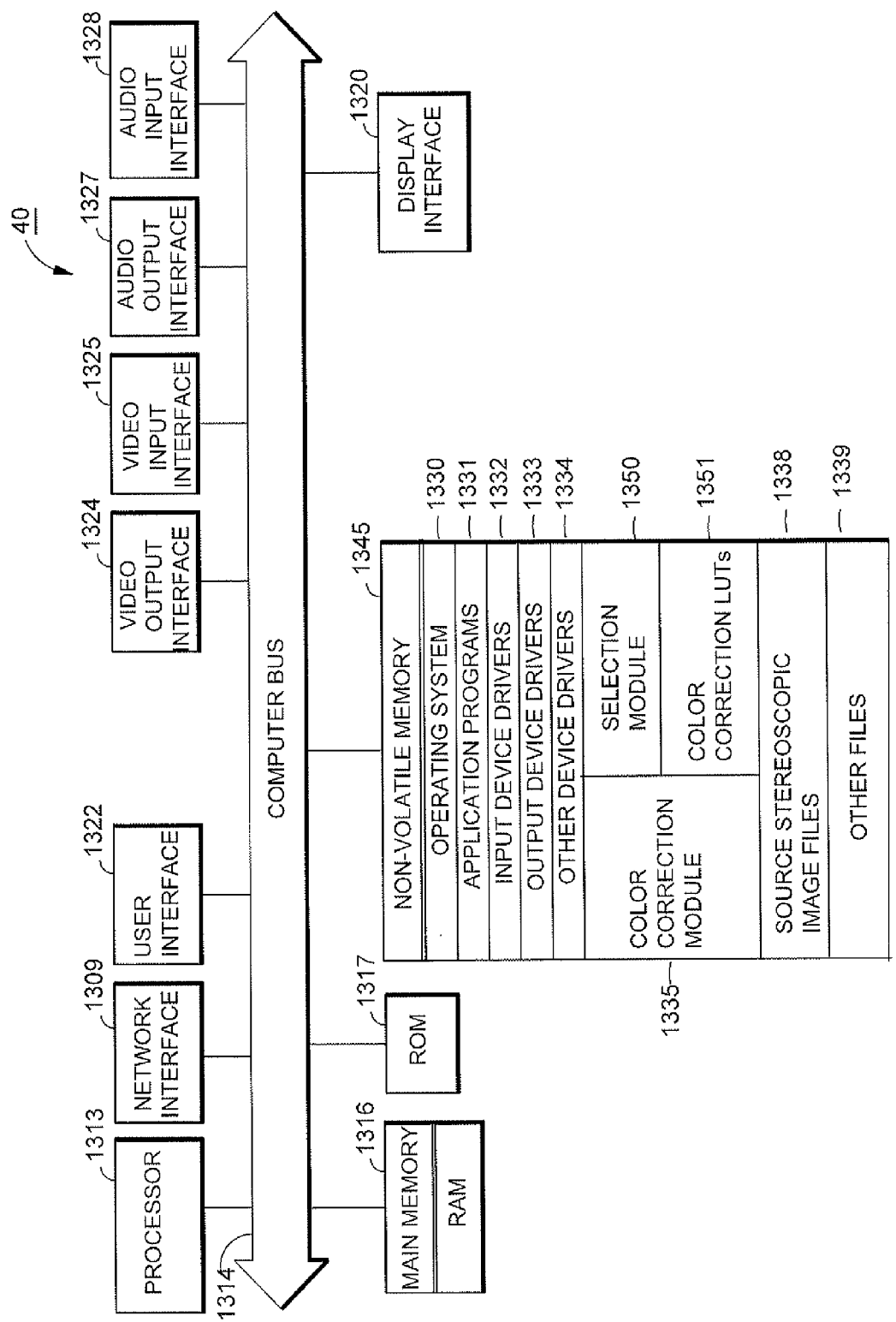
FIG. 13 is a detailed block diagram showing the internal architecture of an autostereoscopic display according to an example embodiment.

FIG. 13 is a detailed block diagram showing the internal architecture of an autostereoscopic display. In the example embodiment described with respect to FIG. 13, the autostereoscopic display is programmed to perform processes described above for steps S403 and S404 of FIG. 4. In other example embodiments, the autostereoscopic display is programmed to perform any combination of the processes described above for FIGS. 4, 8 and 9.

As shown in FIG. 13, the data processing apparatus includes processor 1313 which interfaces with computer bus 1314. Also interfacing with computer bus 1314 are non-volatile memory (NVM) 1345, network interface 1309, random access memory (RAM) 1316 for use as a main run-time transient memory, read only memory (ROM) 1317, display interface 1320 for color display pixels, user interface 1322 (e.g., a remote control, a touch-screen interface, a keyboard, a mouse, or the like), video input interface 1325 for a video input device (e.g., a DVD player, set top box, media server, or the like), video output interface 1324 for a video output device, audio input interface 1328 for an audio input device (e.g., a DVD player, set top box, media server, or the like), and audio output interface 1327 for an audio output device.

RAM 1316 interfaces with computer bus 1314 so as to provide information stored in RAM 1316 to processor 1313 during execution of the instructions in software programs such as a display driver. More specifically, processor 1313 first loads computer-executable process steps from NVM 1345, or another storage device into a region of RAM 1316. Processor 1313 can then execute the stored process steps from RAM 1316 in order to execute the loaded computer-executable process steps. Data such as color stereoscopic images or other information can be stored in RAM 1316, so that the data can be accessed by processor 1313 during the execution of computer-executable software programs, to the extent that such software programs have a need to access and/or modify the data.

As also shown in FIG. 13, NVM 1345 is a computer-readable storage medium that stores computer-executable process steps for operating system 1330, and application programs 1331. NVM 1345 also stores computer-executable process steps for device drivers for software interface to devices, such as input device drivers 1332, output device drivers 1333, and other device drivers 1334. Source stereoscopic image files 1338, including color image files, and other files 1339 are available for output to color output devices and for manipulation by application programs.

Color correction module (CCM) 1335 generally comprises computer-executable process steps stored on a computer-readable storage medium, e.g., NVM 1345, and executed by a computer. Examples of other computer-readable storage medium include a fixed disk, a DVD, a CD ROM, a RAM, a flash drive, or the like.

The stored computer-executable process steps of CCM 1335 are executed by a processor to correct color displayed by the autostereoscopic color display. CCM 1335 includes selection module 1350 and color correction LUTs 1351. More specifically, selection module 1350 selects color correction LUTs corresponding to current viewing regions, based on information regarding viewer location. Selection module 1350 applies the selected color correction LUTs to the autostereoscopic display. There is at least one color correction LUT for each different viewing region of the autostereoscopic display. The multiple viewing regions together comprise the whole of an operating viewing zone for the autostereoscopic color display.

The computer-executable process steps for CCM 1335 may be configured as a part of operating system 1330, as part of an output device driver such as a display driver, or as a stand-alone application program such as a color management system. They may also be configured as a plug-in or dynamic link library (DLL) to the operating system, device driver or application program. For example, CCM 1335 according to example embodiments may be incorporated in an output device driver for execution in a computing device, such as a display driver, embedded in the firmware of an output device, such as a display, or provided in a stand-alone color management application for use on a general purpose computer. In one example embodiment described herein, CCM 1335 is incorporated directly into the operating system for a general purpose host computer. It can be appreciated that the present disclosure is not limited to these embodiments and that the disclosed color management module may be used in other environments in which color management is used.

Figure 14:
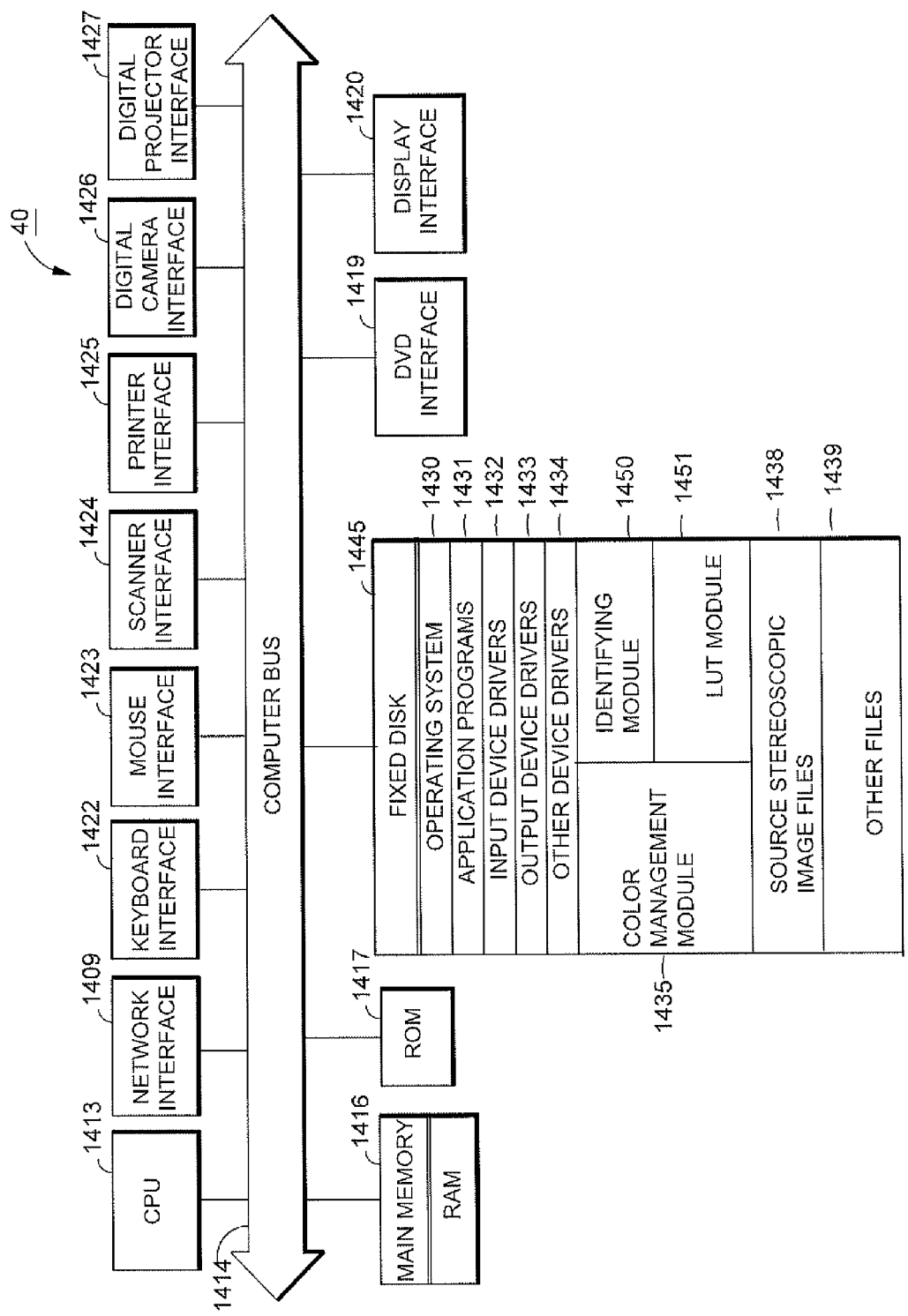
FIG. 14 is a detailed block diagram showing the internal architecture of a data processing apparatus according to an example embodiment.

FIG. 14 is a detailed block diagram showing the internal architecture of a data processing apparatus, such as a general purpose computing machine. In the example embodiment described with respect to FIG. 14, the data processing apparatus is programmed to perform processes described above for steps S401 and S402 of FIG. 4, and the steps of FIGS. 8 and 9. In other example embodiments, the autostereoscopic display is programmed to perform any combination of the processes described above for FIGS. 4, 8 and 9.

As shown in FIG. 14, the data processing apparatus includes central processing unit (CPU) 1413 which interfaces with computer bus 1414. Also interfacing with computer bus 1414 are hard disk 1445, network interface 1409, random access memory (RAM) 1416 for use as a main run-time transient memory, read only memory (ROM) 1417, DVD disk interface 1419, display interface 1420 for a monitor (not shown), keyboard interface 1422 for a keyboard (not shown), mouse interface 1423 for a pointing device (not shown), scanner interface 1424 for a scanner (not shown), printer interface 1425 for a printer (not shown), digital camera interface 1426 for a digital camera (not shown), and digital projector interface 1427 for a digital projector (not shown).

RAM 1416 interfaces with computer bus 1414 so as to provide information stored in RAM 1416 to CPU 1413 during execution of the instructions in software programs such as an operating system, application programs, color management modules, and device drivers. More specifically, CPU 1413 first loads computer-executable process steps from fixed disk 1445, or another storage device into a region of RAM 1416. CPU 1413 can then execute the stored process steps from RAM 1416 in order to execute the loaded computer-executable process steps. Data such as color stereoscopic images or other information can be stored in RAM 1416, so that the data can be accessed by CPU 1413 during the execution of computer-executable software programs, to the extent that such software programs have a need to access and/or modify the data.

As also shown in FIG. 14, hard disk 1445 contains computer-executable process steps for operating system 1430, and application programs 1431, such as word processing programs or a graphic image management programs. Hard disk 1445 also contains computer-executable process steps for device drivers for software interface to devices, such as input device drivers 1432, output device drivers 1433, and other device drivers 1434. Source stereoscopic image files 1438, including color image files, and other files 1439 are available for output to color output devices and for manipulation by application programs.

Color management module (CMM) 1435 generally comprises computer-executable process steps stored on a computer-readable storage medium, e.g., hard disk 1445, and executed by a computer. Examples of other computer-readable storage medium include a fixed disk, a DVD, a CD ROM, a RAM, a flash drive, or the like.

The computer-executable process steps of CMM 1435 are executed by a computer that constructs color correction LUTs that are used by an autostereoscopic color display. CMM 1435 includes identifying module 1450 and LUT module 1451. More specifically, identifying module 1450 identifies multiple viewing regions of the autostereoscopic color display. The multiple viewing regions together comprise the whole of an operating viewing zone for the auto stereoscopic color display. LUT module 1451 constructs at least one color correction for each different viewing region. The autostereoscopic color display selects color correction LUTs corresponding to current viewing regions, based on information regarding viewer location, and applies the selected color correction LUTs to the autostereoscopic display.

The computer-executable process steps for CMM 1435 may be configured as a part of operating system 1430, as part of an output device driver such as a display driver, or as a stand-alone application program such as a color management system. They may also be configured as a plug-in or dynamic link library (DLL) to the operating system, device driver or application program. For example, CMM 1435 according to example embodiments may be incorporated in an output device driver for execution in a computing device, such as a display driver, embedded in the firmware of an output device, such as a display, or provided in a stand-alone color management application for use on a general purpose computer. In one example embodiment described herein, CMM 1435 is incorporated directly into the operating system for a general purpose host computer. It can be appreciated that the present disclosure is not limited to these embodiments and that the disclosed color management module may be used in other environments in which color management is used.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for color correction of an autostereoscopic color display capable of displaying multiple stereo views of one scene, the method comprising:
   identifying multiple viewing regions of the autostereoscopic color display, wherein the multiple viewing regions together comprise the whole of an operating viewing zone for the autostereoscopic color display;
   constructing a respective plurality of color correction LUTs, wherein at least one color correction LUT is constructed for each different viewing region and at least two or more viewing regions are classified into a group such that a common gamut mapping is used in each of the color correction LUTs for the two or more viewing regions in the group;
   selecting color correction LUTs corresponding to current viewing regions based on information regarding viewer location; and
   applying the selected color correction LUTs to the autostereoscopic color display.

2. A method according to claim 1, wherein the information regarding viewer location is based on an actual location of a viewer.

3. A method according to claim 1, wherein the information regarding viewer location is based on a predesignated viewing location preference.

4. A method according to claim 1, wherein construction of the respective plurality of color correction LUTs comprises:
   classification of the viewing regions into groups based on similarity in color gamut; and
   for each group of viewing regions having similar color gamuts, determination of a common gamut that is an intersection of all the gamuts in the group and gamut mapping of color data to the common gamut.

5. A method according to claim 1, wherein the viewing regions are identified based on geometry dependent on the optical design of the autostereoscopic color display.

6. A method according to claim 5, wherein the viewing regions are diamond shaped.

7. A method according to claim 1, wherein a stereo parallax is perceived by a viewer located in any pair of viewing regions, and wherein a movement parallax is perceived when the viewer shifts position from one pair of viewing regions to another pair of viewing regions.

8. A method according to claim 1, wherein each color correction LUT provides a mapping from a standard color space corresponding to a view of a stereoscopic image to be displayed to a color space corresponding to one of the viewing regions, and wherein for each color correction LUT, the LUT is applied by mapping colors in the standard color space to corresponding colors in the viewing region's color space, and providing the mapped colors to the autostereoscopic color display.

9. A color correction module for an autostereoscopic color display capable of displaying multiple stereo views of one scene, the color correction module comprising:
   a selection module constructed to select color correction LUTs corresponding to current viewing regions of the autostereoscopic display, based on information regarding viewer location, and constructed to apply the selected color correction LUTs to the autostereoscopic color display,
   wherein an identifying module identifies multiple viewing regions of the autostereoscopic color display, the multiple viewing regions together comprising the whole of an operating viewing zone for the autostereoscopic color display,
   wherein an LUT module constructs at least one color correction LUT for each different viewing region, and
   wherein at least two or more viewing regions are classified into a group such that a common gamut mapping is used in each of the color correction LUTs for the two or more viewing regions in the group.

10. A module according to claim 9, wherein the information regarding viewer location is based on an actual location of a viewer.

11. A module according to claim 9, wherein the information regarding viewer location is based on a predesignated viewing location preference.

12. A module according to claim 9, wherein the LUT module comprises:
   a classification module that classifies each of the viewing regions into groups based on similarity in color gamut; and
   a determination module that determines, for each group of viewing regions having similar color gamuts, a common gamut that is an intersection of all the gamuts in the group;
   wherein color data is gamut-mapped to the common gamut.

13. A module according to claim 9, wherein the viewing regions are identified based on geometry dependent on the optical design of the autostereoscopic color display.

14. A module according to claim 13, wherein the viewing regions are diamond shaped.

15. A module according to claim 9, wherein a stereo parallax is perceived by a viewer located in any pair of viewing regions, and wherein a movement parallax is perceived when the viewer shifts position from one pair of viewing regions to another pair of viewing regions.

16. A module according to claim 9, wherein each color correction LUT provides a mapping from a standard color space corresponding to a view of a stereoscopic image to be displayed to a color space corresponding to one of the viewing regions, and wherein for each color correction LUT, the LUT is applied by mapping colors in the standard color space to corresponding colors in the viewing region's color space, and providing the mapped colors to the autostereoscopic color display.

17. An autostereoscopic display capable of displaying multiple stereo views of one scene, the autostereoscopic display comprising:
   a computer-readable memory constructed to store computer-executable process steps; and
   a processor constructed to execute the computer-executable process steps stored in the memory;
   wherein the process steps stored in the memory cause the processor to perform a method for color correction of the autostereoscopic color display, and include computer-executable process steps to:
   select color correction LUTs corresponding to current viewing regions of the autostereoscopic display, based on information regarding viewer location; and
   apply the selected color correction LUTs to the autostereoscopic color display,
   wherein multiple viewing regions of the autostereoscopic color display are identified, the multiple viewing regions together comprising the whole of an operating viewing zone for the autostereoscopic color display,
   wherein at least one color correction LUT is constructed for each different viewing region, and
   wherein at least two or more viewing regions are classified into a group such that a common gamut mapping is used in each of the color correction LUTs for the two or more viewing regions in the group.

18. An autostereoscopic display according to claim 17, wherein the information regarding viewer location is based on an actual location of a viewer.

19. An autostereoscopic display according to claim 17, wherein the information regarding viewer location is based on a predesignated viewing location preference.

20. An autostereoscopic display according to claim 17, wherein construction of the respective plurality of color correction LUTs comprises:
   classification of the viewing regions into groups based on similarity in color gamut; and
   for each group of viewing regions having similar color gamuts, determination of a common gamut that is an intersection of all the gamuts in the group and gamut mapping of color data to the common gamut.

21. An autostereoscopic display according to claim 17, wherein the viewing regions are identified based on geometry dependent on the optical design of the autostereoscopic color display.

22. An autostereoscopic display according to claim 21, wherein the viewing regions are diamond shaped.

23. An autostereoscopic display according to claim 17, wherein a stereo parallax is perceived by a viewer located in any pair of viewing regions, and wherein a movement parallax is perceived when the viewer shifts position from one pair of viewing regions to another pair of viewing regions.

24. An autostereoscopic display according to claim 17, wherein each color correction LUT provides a mapping from a standard color space corresponding to a view of a stereoscopic image to be displayed to a color space corresponding to one of the viewing regions, and wherein for each color correction LUT, the LUT is applied by mapping colors in the standard color space to corresponding colors in the viewing region's color space, and providing the mapped colors to the autostereoscopic color display.

25. A computer-readable memory medium on which is stored computer-executable process steps for causing a processor to perform a method for color correction of an autostereoscopic color display capable of displaying multiple stereo views of one scene, said process steps comprising:
   selecting color correction LUTs corresponding to current viewing regions of the autostereoscopic display, based on information regarding viewer location; and applying the selected color correction LUTs to the autostereoscopic color display,
wherein multiple viewing regions of the autostereoscopic color display are identified, the multiple viewing regions together comprising the whole of an operating viewing zone for the autostereoscopic color display, and
wherein at least one color correction LUT is constructed for each different viewing region, and
wherein at least two or more viewing regions are classified into a group such that a common gamut mapping is used in each of the color correction LUTs for the two or more viewing regions in the group.

26. A computer-readable memory medium according to claim 25, wherein the information regarding viewer location is based on an actual location of a viewer.

27. A computer-readable memory medium according to claim 25, wherein the information regarding viewer location is based on a predesignated viewing location preference.

28. A computer-readable memory medium according to claim 25, wherein construction of the respective plurality of color correction LUTs comprises:
classification of the viewing regions into groups based on similarity in color gamut; and
for each group of viewing regions having similar color gamuts, determination of a common gamut that is an intersection all the gamuts in the group and gamut mapping of color data to the common gamut.

29. A computer-readable memory medium according to claim 25, wherein the viewing regions are identified based on geometry dependent on the optical design of the autostereoscopic color display.

30. A computer-readable memory medium according to claim 29, wherein the viewing regions are diamond shaped.

31. A computer-readable memory medium according to claim 25, wherein a stereo parallax is perceived by a viewer located in any pair of viewing regions, and wherein a movement parallax is perceived when the viewer shifts position from one pair of viewing regions to another pair of viewing regions.

32. A computer-readable memory medium according to claim 25, wherein each color correction LUT provides a mapping from a standard color space corresponding to a view of a stereoscopic image to be displayed to a color space corresponding to one of the viewing regions, and wherein for each color correction LUT, the LUT is applied by mapping colors in the standard color space to corresponding colors in the viewing region's color space, and providing the mapped colors to the autostereoscopic color display.

\* \* \* \* \*